O. C. EDWARDS, Jr.
CAISSON.
APPLICATION FILED DEC. 13, 1906.
1,014,626.
Patented Jan. 9, 1912.
10 SHEETS—SHEET 2.
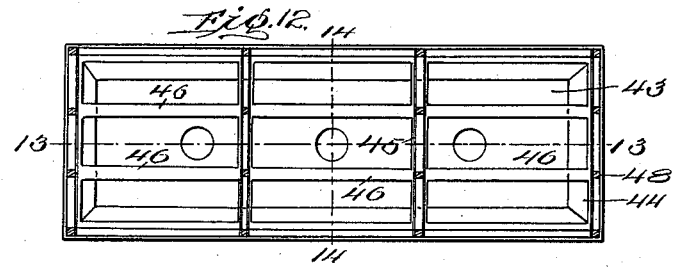
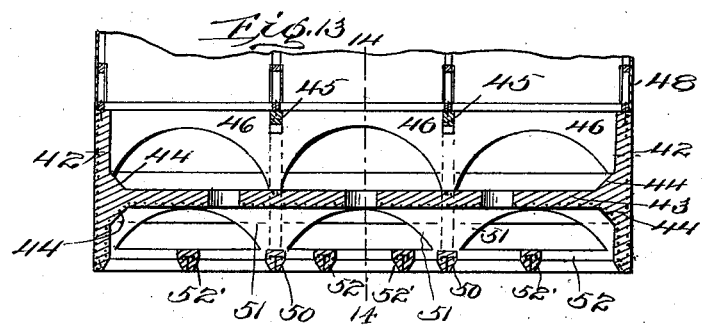
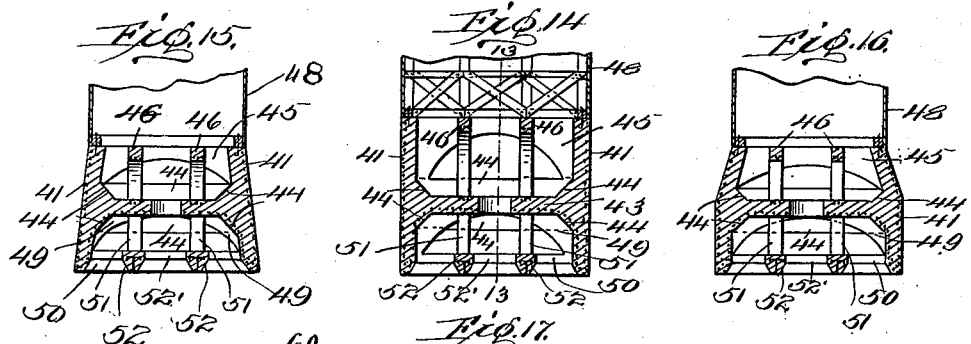
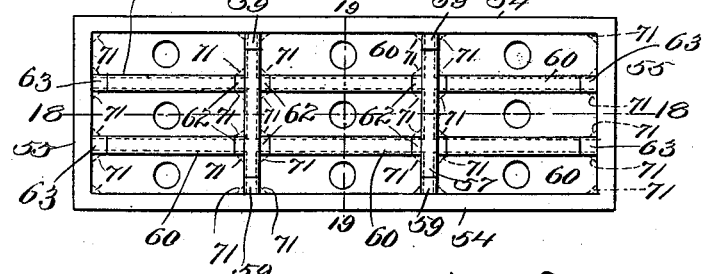
Witnesses
J. M. Fowler Jr.
Edgar M. Kitchin
Inventor
Oliver C. Edwards, Jr.
By Mason, Fenwick & Lawrence
his Attorneys O. C. EDWARDS, Jr.
CAISSON.
APPLICATION FILED DEC. 13, 1906.
1,014,626.
Patented Jan. 9, 1912.
10 SHEETS—SHEET 3.
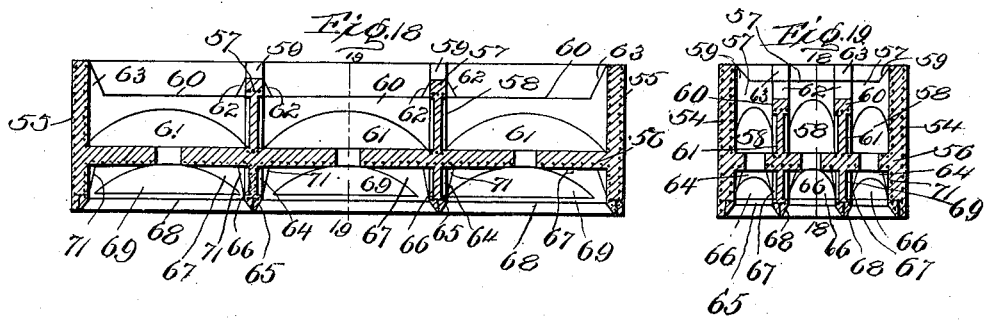
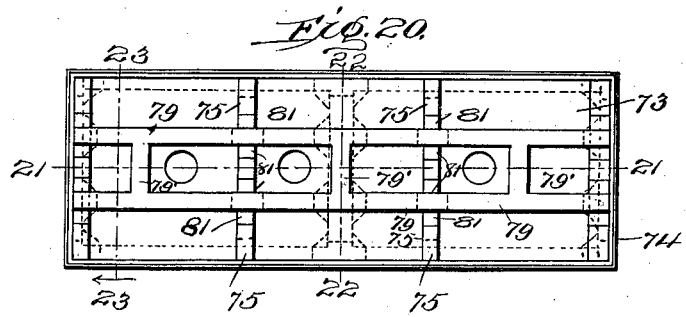
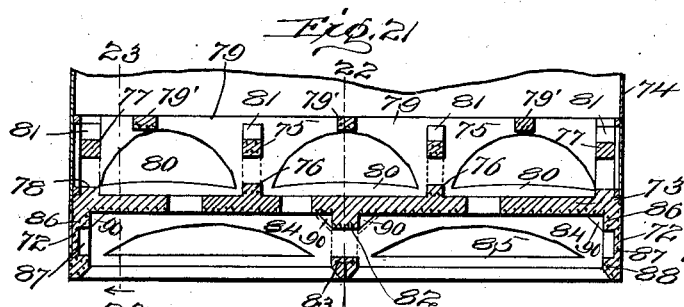
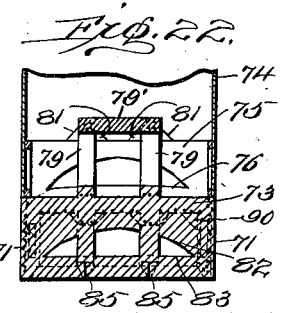
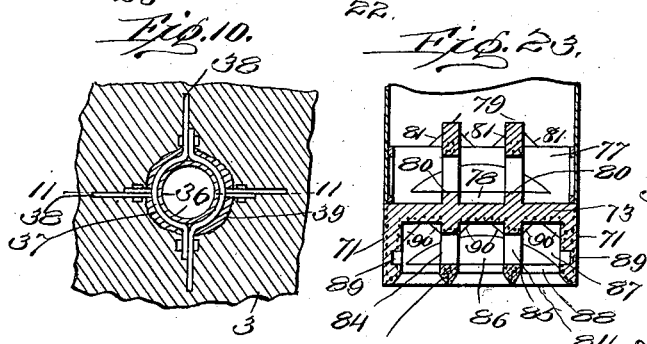
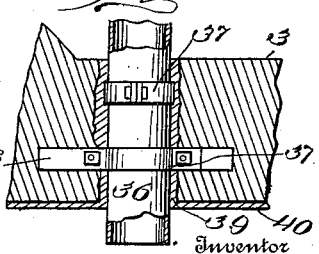
Witnesses
J. M. Fowler Jr
Edgar M. Kitchin
Inventor
Oliver C. Edwards, Jr.
By Mason, Fenwick & Lawrence
his Attorneys

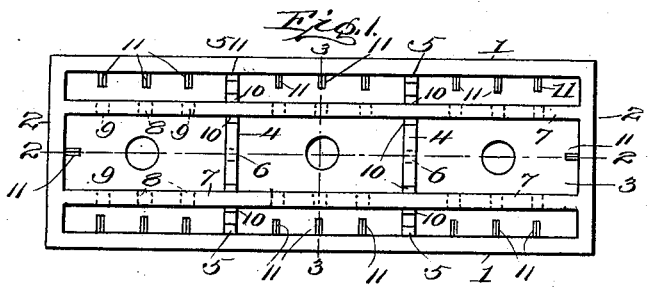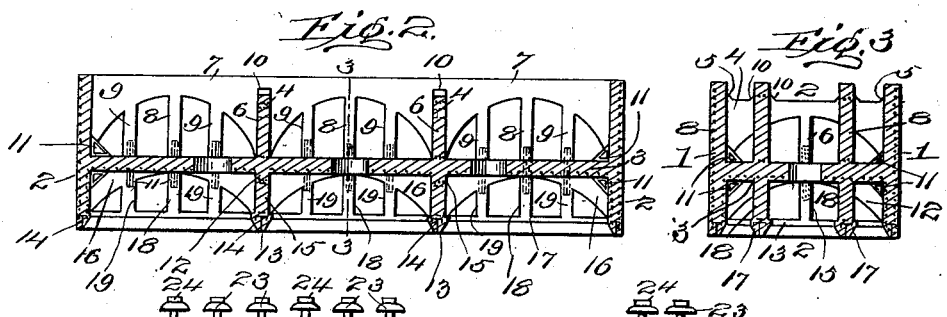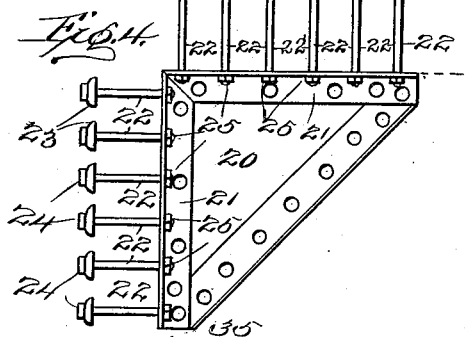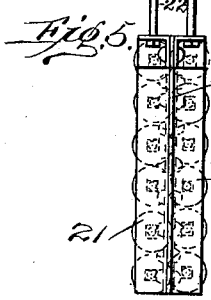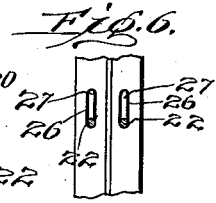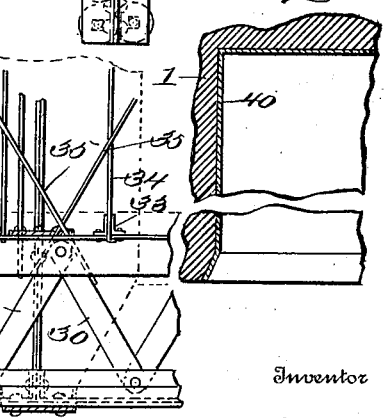

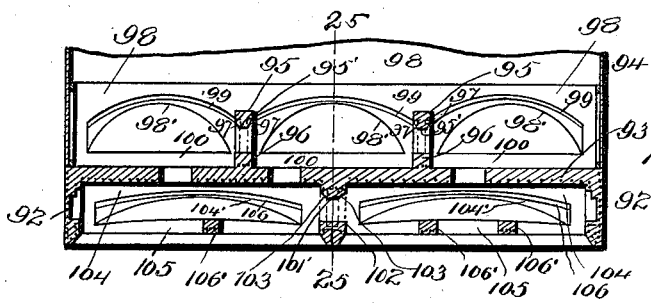
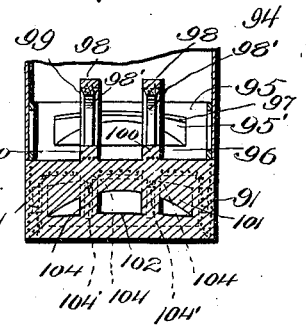
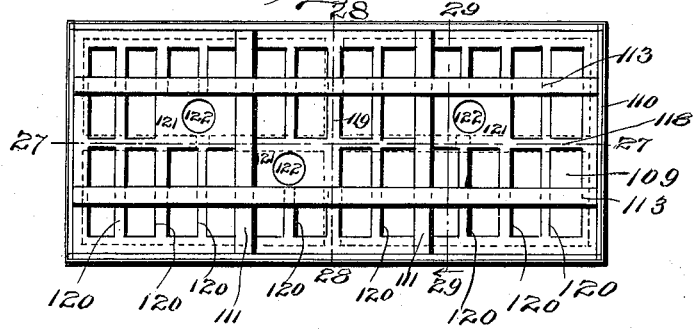
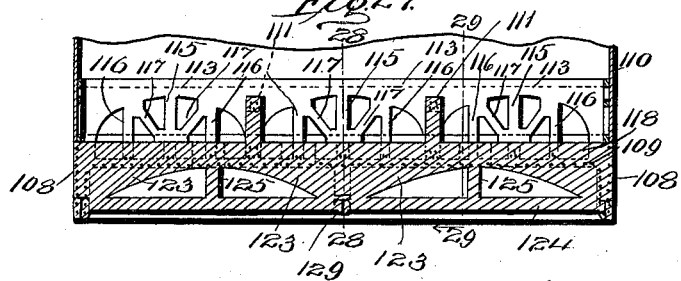
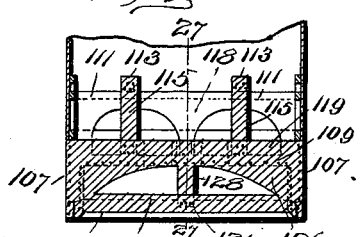

O. C. EDWARDS, Jr.
CAISSON.
APPLICATION FILED DEC. 13, 1906.
1,014,626.
Patented Jan. 9, 1912.
10 SHEETS—SHEET 5.
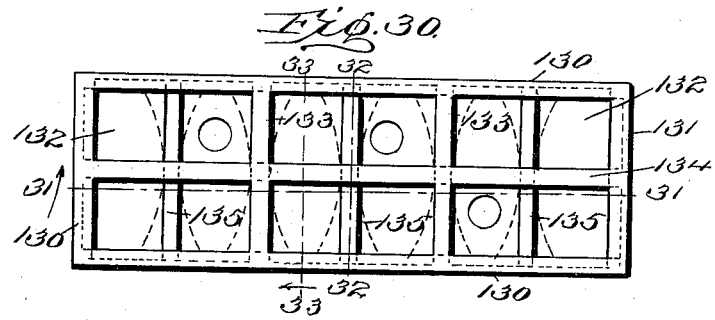
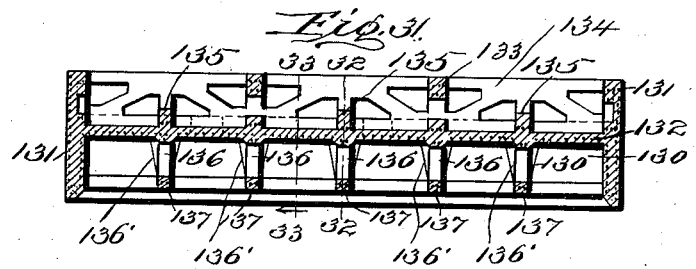
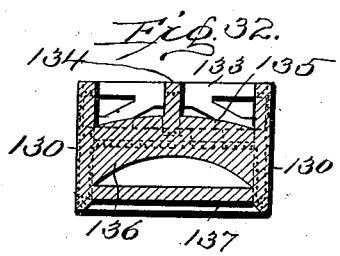
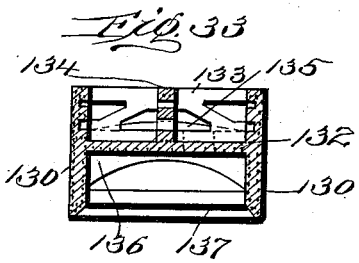
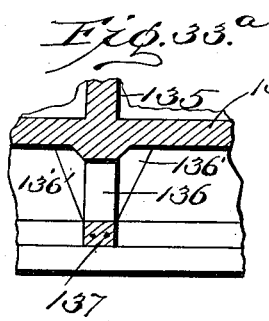
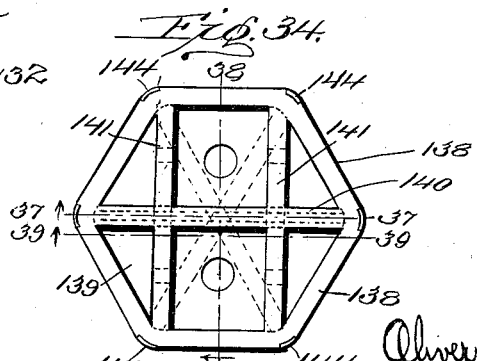

O. C. EDWARDS, Jr.
CAISSON.
APPLICATION FILED DEC. 13, 1906.
1,014,626.
Patented Jan. 9, 1912.
10 SHEETS—SHEET 6.
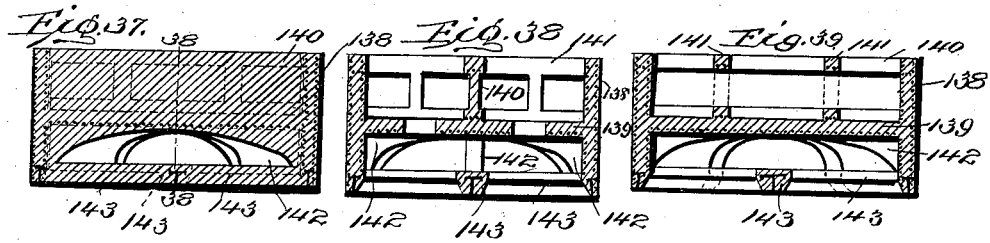
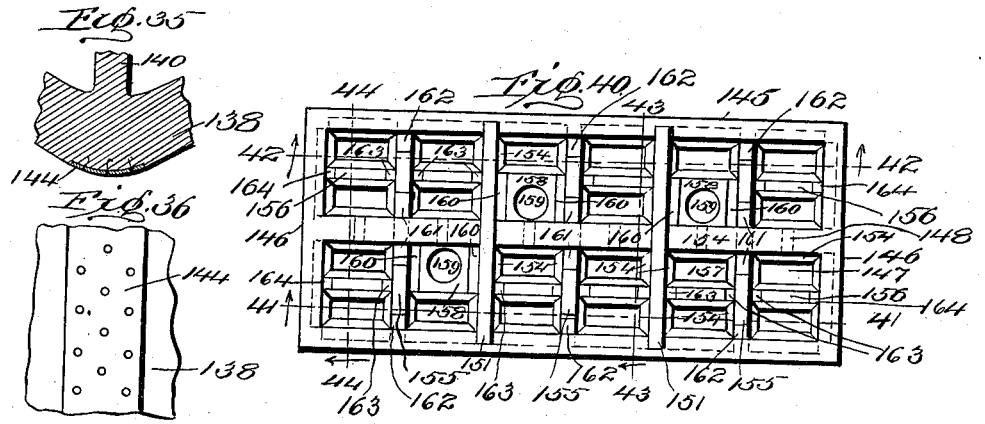
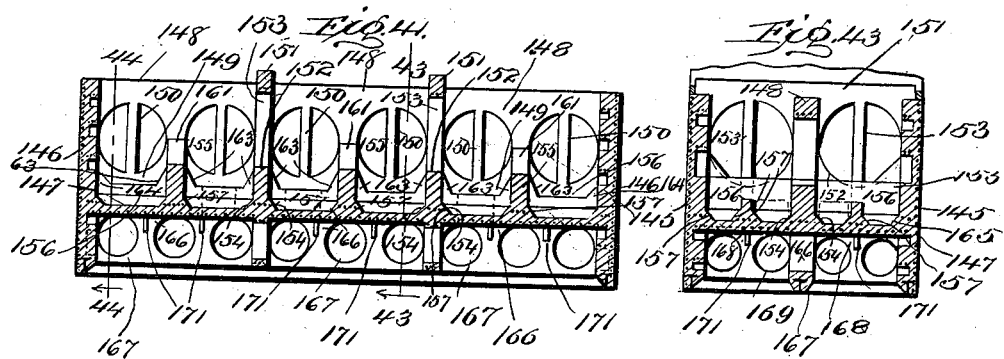
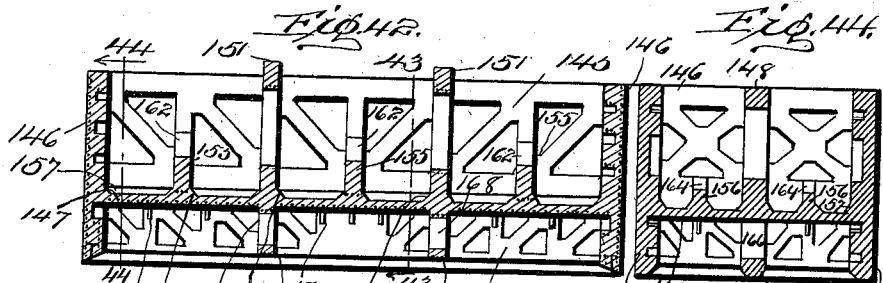

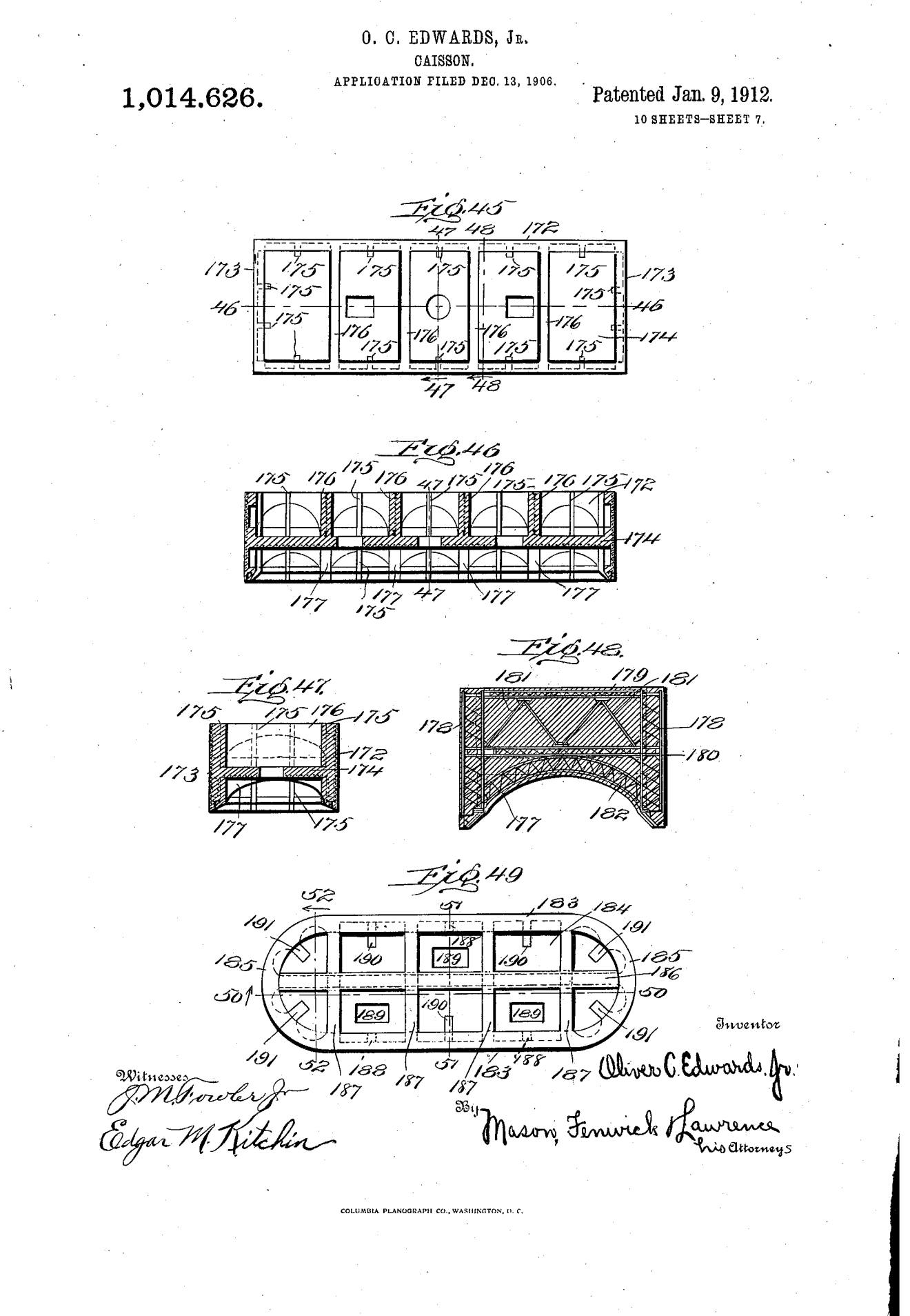

O. C. EDWARDS, Jr.
CAISSON.
APPLICATION FILED DEC. 13, 1906.

1,014,626.

Patented Jan. 9, 1912.
10 SHEETS—SHEET 7.

O. C. EDWARDS, Jr.
CAISSON.
APPLICATION FILED DEC. 13, 1906.
1,014,626.
Patented Jan. 9, 1912.
10 SHEETS—SHEET 8.
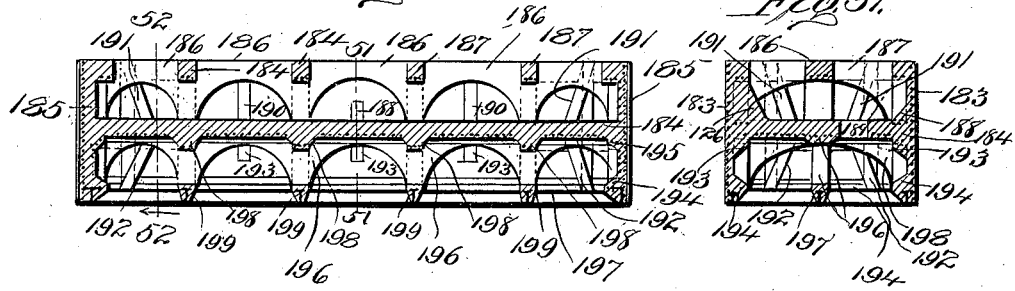
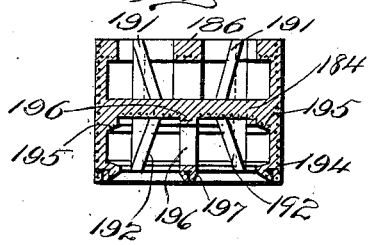
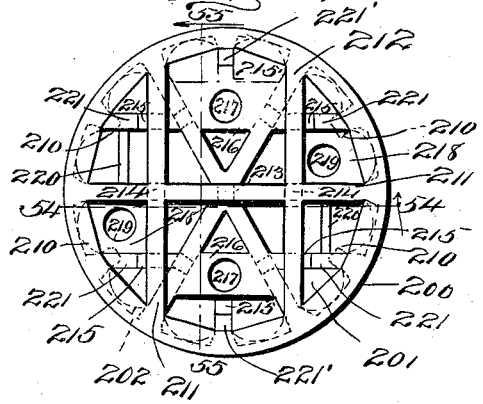
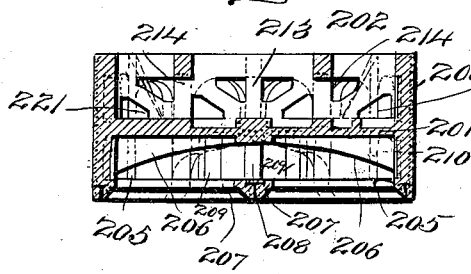
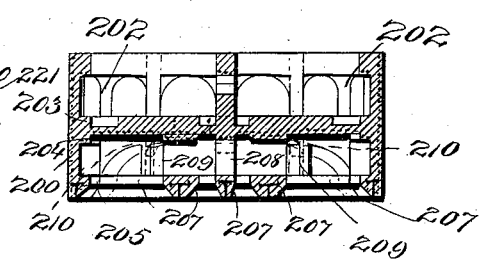
Witnesses
J. M. Fowler Jr.
Edgar M. Kitchin
Inventor
Oliver C. Edwards, Jr.,
By Mason, Fenwick & Lawrence
his Attorneys O. C. EDWARDS, Jr.
CAISSON.
APPLICATION FILED DEC. 13, 1906.
1,014,626.
Patented Jan. 9, 1912.
10 SHEETS—SHEET 9.
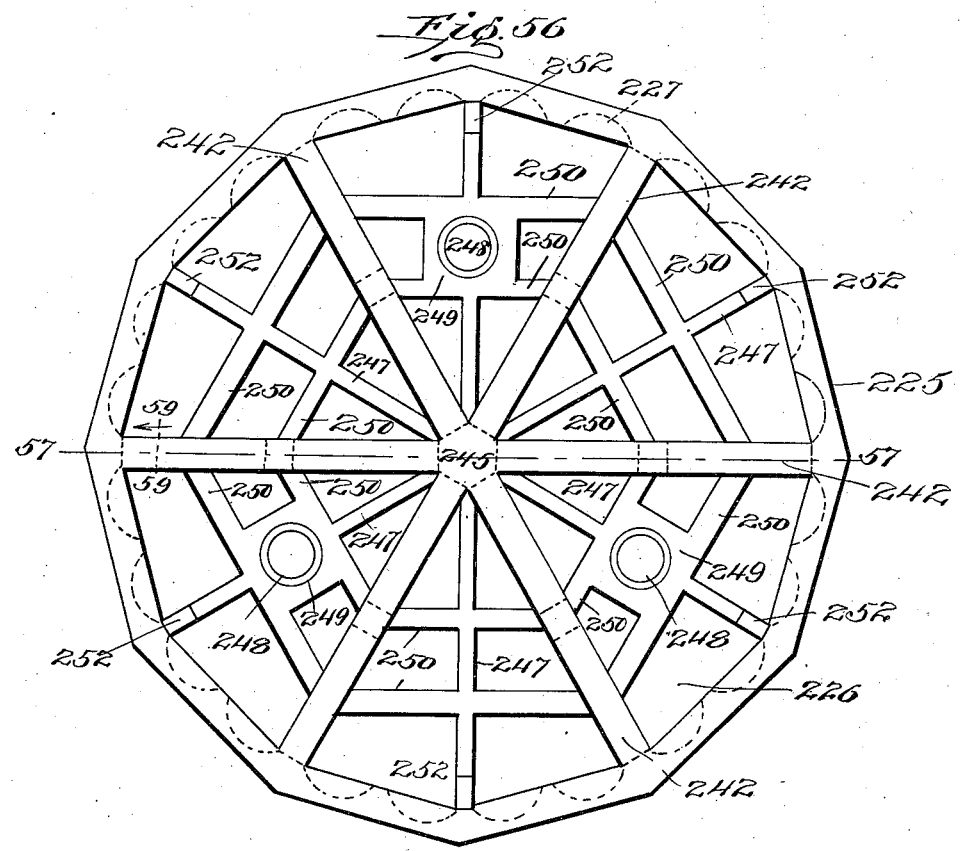
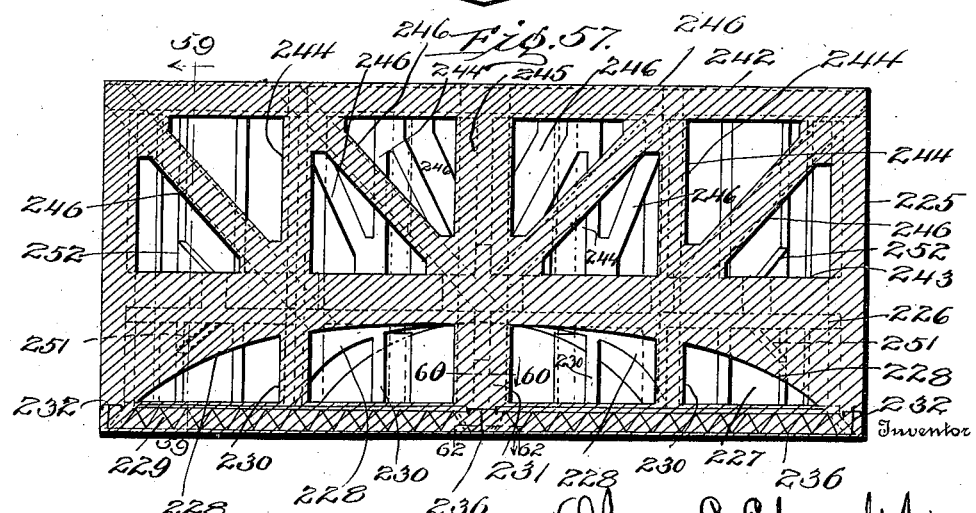

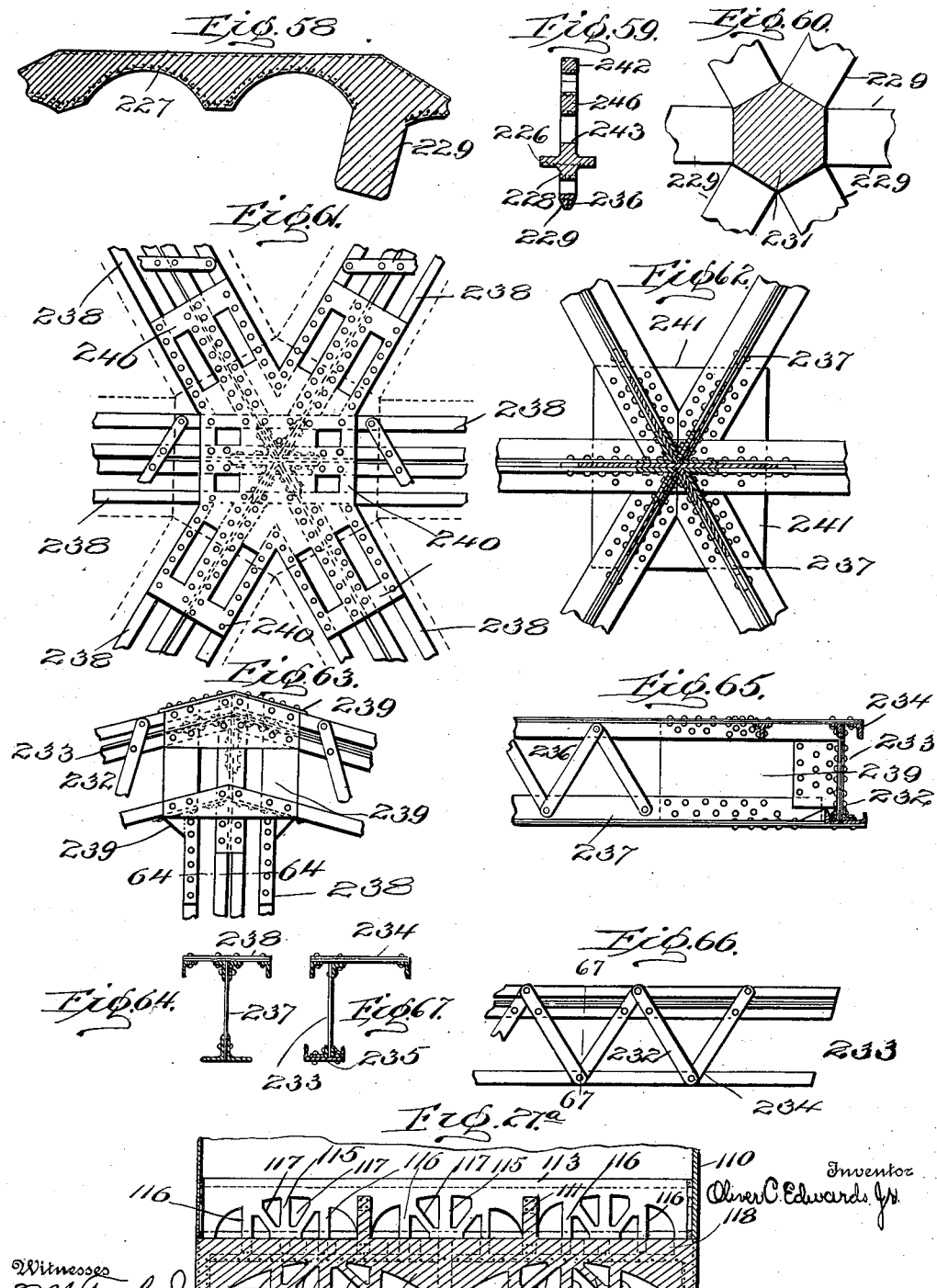

UNITED STATES PATENT OFFICE.

OLIVER CROMWELL EDWARDS, JR., OF TROY, NEW YORK.

CAISSON.

1,014,626.

Specification of Letters Patent. Patented Jan. 9, 1912.

Application filed December 13, 1906. Serial No. 347,687.

*To all whom it may concern:*

Be it known that I, OLIVER C. EDWARDS, Jr., C. E., a citizen of the United States, residing at Troy, in the county of Rensselaer and State of New York, have invented certain new and useful Improvements in Caissons; and I do hereby declare the following to be a full, clear, and exact description of the invention, such as will enable others skilled in the art to which it appertains to make and use the same.

This invention relates to improvements in caissons, and more particularly to caissons designed to be constructed largely or entirely of concrete.

The object in view is the production of a caisson whose design is such as to attain a maximum strength with a minimum amount of material and at a minimum expense.

With this and further objects in view the invention comprises the combination of a caisson inclosure and an arched brace extending across said inclosure and positioned for strengthening the walls of the inclosure.

The invention also comprises certain other novel constructions, combinations and arrangement of parts as will be hereinafter more fully described and claimed.

In the accompanying drawings:—Figure 1 is a top plan view of a caisson incorporating one embodiment of the present invention. Fig. 2 is a longitudinal, vertical, central section taken therethrough on the plane indicated by line 2, 2 of Fig. 1. Fig. 3 is a transverse, vertical, central section taken on the plane indicated by line 3, 3 of Figs. 1 and 2. Fig. 4 is a detail view in side elevation of one of the detachable metallic knee braces, the parts being shown on an enlarged scale. Fig. 5 is a view in front elevation thereof. Fig. 6 is a fragmentary detail plan view showing two of the retaining bolts in section. Fig. 7 is a transverse, vertical section through a metallic reinforcement for one of the cutting edges. Fig. 8 is a fragmentary view in side elevation thereof. Fig. 9 is an enlarged detail fragmentary view of a portion of a wall of the working chamber of the caisson illustrating in detail the coating employed for preventing leakage of compressed air. Fig. 10 is a horizontal section through a fragment of the roof of the caisson showing one of the air shafts in section and the supports therefor in elevation. Fig. 11 is a vertical section taken on the plane indicated by line 11, 11 of Fig. 10, parts being seen in elevation. Fig. 12 is a top plan view of a slightly modified form of caisson. Fig. 13 is a longitudinal, vertical, central section taken therethrough on the plane indicated by line 13, 13 of Figs. 12 and 14. Fig. 14 is a transverse, vertical, central section taken on the plane indicated by line 14, 14 of Figs. 12 and 13. Fig. 15 is a transverse, vertical, central section through a caisson embodying the elements disclosed in Figs. 12 to 14 inclusive, but with the upright walls illustrated as inclined. Fig. 16 is a similar view of a further modification showing the upright walls of the working chamber vertical, and the coffer dam walls inclined. Fig. 17 is a top plan view of a further modified form of caisson. Fig. 18 is a longitudinal, vertical, central section taken on the plane indicated by line 18, 18 of Figs. 17 and 19. Fig. 19 is a transverse, vertical, central section taken on the plane indicated by line 19, 19 of Figs. 17 and 18. Fig. 20 is a top plan view of a further modified form of caisson. Fig. 21 is a longitudinal, vertical, central section taken on the plane indicated by line 21, 21 of Fig. 20. Fig. 22 is a transverse, vertical, central section taken on the plane indicated by line 22, 22 of Figs. 20 and 21. Fig. 23 is a transverse, vertical, section taken on the plane indicated by line 23, 23 of Figs. 20 and 21, and looking in the direction indicated by the arrow. Fig. 24 is a longitudinal, vertical, central section taken through a further modified form of caisson. Fig. 25 is a transverse, vertical, central section taken on the plane indicated by line 25, 25 of Fig. 24. Fig. 26 is a top plan view of a further modified form of caisson. Fig. 27 is a longitudinal, vertical, central section taken on the plane indicated by line 27, 27 of Figs. 26, 28 and 29. Fig. 27ª is a similar view of a slightly modified form of structure. Fig. 28 is a transverse, vertical, central section taken on the plane indicated by line 28, 28 of Figs. 26 and 27. Fig. 29 is a transverse, vertical section taken on the plane indicated by line 29, 29 of Figs. 26 and 27, and looking in the direction indicated by the arrow. Fig. 30 is a top plan view of a further modified form of caisson. Fig. 31 is a longitudinal, vertical, section taken on the plane indicated by line 31, 31 of Fig. 30, and looking in the direction indicated by the arrow. Fig. 32 is a transverse, vertical, central section taken on the plane indicated by line 32, 32 of Figs. 30 and 31. Fig. 33 is a transverse, vertical section taken on the plane indicated by line 33, 33 of Figs. 30 and 31, and looking in the direction indicated by the arrow. Fig. 33ᵃ is an enlarged detail vertical section through a fragment of the roof and one of the transverse, working chamber trusses. Fig. 34 is a top plan view of a further modified form of caisson of polysided conformation. Fig. 35 is an enlarged, detail, horizontal section through a fragment of one of the corners produced by the juncture of two of the vertical walls of the caisson seen in Fig. 34. Fig. 36 is a view in side elevation of the structure seen in Fig. 35. Fig. 37 is a vertical, central section taken on the plane indicated by line 37, 37 of Fig. 34, looking in the direction indicated by the arrow. Fig. 38 is a vertical, central section taken on the plane indicated by line 38, 38 of Figs. 34 and 37, looking in the direction indicated by the arrow. Fig. 39 is a vertical section taken on the plane indicated by line 39, 39 of Fig. 34, and looking in the direction indicated by the arrow. Fig. 40 is a top plan view of a further modified form of caisson. Fig. 41 is a longitudinal, vertical section taken on the plane indicated by line 41, 41 of Fig. 40, and looking in the direction indicated by the arrow. Fig. 42 is a longitudinal, vertical section taken on the plane indicated by line 42, 42 of Fig. 40, looking in the direction indicated by the arrow. Fig. 43 is a transverse, vertical section taken on the plane indicated by line 43, 43 of Figs. 40, 41 and 42, and looking in the direction indicated by the arrow. Fig. 44 is a transverse, vertical section taken on the plane indicated by line 44, 44 of Figs. 40, 41 and 42, and looking in the direction indicated by the arrow. Fig. 45 is a top plan view of a further modified form of caisson. Fig. 46 is a longitudinal, vertical, central section taken on the plane indicated by line 46, 46 of Fig. 45. Fig. 47 is a transverse, vertical, central section taken on the plane indicated by line 47, 47 of Figs. 45 and 46. Fig. 48 is a transverse, vertical section taken on the plane indicated by line 48, 48 of Fig. 45, and looking in the direction indicated by the arrow, the parts being seen on an enlarged scale. Fig. 49 is a top plan view of a further modified form of caisson. Fig. 50 is a longitudinal, vertical section therethrough taken on the plane indicated by line 50, 50 of Fig. 49, and looking in the direction indicated by the arrow. Fig. 51 is a transverse, vertical, central section taken on the plane indicated by line 51, 51 of Figs. 49 and 50. Fig. 52 is a similar section taken on the plane indicated by line 52, 52 of Figs. 49 and 50 and looking in the direction indicated by the arrow. Fig. 53 is a top plan view of a further modified form of caisson. Fig. 54 is a vertical section taken on the plane indicated by line 54, 54 of Fig. 53, and looking in the direction indicated by the arrow. Fig. 55 is a vertical section taken on the plane indicated by line 55, 55 of Fig. 53, and looking in the direction indicated by the arrow. Fig. 56 is a top plan view of a further modified form of caisson. Fig. 57 is a vertical, central section taken on the plane indicated by line 57, 57 of Fig. 56. Fig. 58 is an enlarged, detail, horizontal section of a fragment of the wall of the caisson seen in Figs. 56 and 57. Fig. 59 is a vertical section taken on the plane indicated by line 59, 59 of Figs. 56 and 57, and looking in the direction indicated by the arrow, the vertical wall being omitted. Fig. 60 is a horizontal detail section taken on the plane indicated by line 60, 60 and looking downwardly, parts being seen on an enlarged scale. Fig. 61 is a similar view of the same parts, the concrete being illustrated in dotted lines and the reinforcement therefor being seen in full lines. Fig. 62 is a horizontal section taken on the planes indicated by lines 62, 62 of Fig. 57, and looking downwardly, the concrete being omitted. Fig. 63 is a detail plan view of the cutting edge reinforcement for the side wall at one of the corners showing the structure of the reinforcement of one of the arch ties. Fig. 64 is a vertical section taken on the plane indicated by lines 64, 64 of Fig. 63. Fig. 65 is a detail view in side elevation of the reinforcement of one of the arch ties, the wall cutting edge reinforcement being shown in section. Fig. 66 is a detail view in top plan of the inclosing wall cutting edge reinforcement. Fig. 67 is a vertical section therethrough taken on the plane indicated by line 67, 67 of Fig. 66.

The present invention comprehends the employment in combination with a caisson of an arched brace arranged in the interior thereof, and connected at its ends with the walls of the caisson. The same general conception directed more particularly to arched braces arranged parallel to and formed integral with the walls throughout their length, and other arched braces generically have been covered by the claims in my co-pending application executed by me on the first day of November, 1906, Serial No. 347,686, and I desire the claims herein not to be construed to cover the features of construction claimed in the said co-pending application.

In Figs. 1 to 3 inclusive I have illustrated an embodiment of the present invention in which 1, 1 indicates side walls, and 2, 2 end walls which are formed integral and provided with an integral roof 3 dividing the inclosure into a working chamber below and a coffer dam above. The side walls 1, 1 of the coffer dam are strengthened and braced by transverse bracing trusses, each consisting of an arch 4 extending from one side to the other and having its ends tied together, by the roof 3. The upper edge of each arch 4, at the point of union with the respective wall 1, is provided with a knee brace 5 formed integral with said wall and arch. Each arch 4 is also strengthened by a vertical post 6 extending from the roof 3 up to and formed integral with the soffit of the arch at the point of the crown.

The end walls 2 are connected by longitudinal braces extending throughout the length of the coffer dam, and each consists of a plurality of arches 7 arranged end to end and formed integral with each other and with the end walls. Each of the arches 7 has its ends tied together by the roof 3, and is further strengthened by a central, vertical post 8, which extends from the roof to the soffit of the respective arch at the crown thereof. Spaced at each side of the post 8 are similar posts 9, 9. The arches 7 intersect the arches 4, and extend above the said arches, all of said arches being formed integral at the points of intersection. At each point of intersection of the arch 4 with the arches 7, the respective arch 4 is connected with the arches 7 by knee braces 10, 10 formed integral with the arches. As illustrated, the arches 4 intersect the arches 7 at the points of the meeting ends of the middle arch 7 with the end arches 7, but it is of course obvious that if the caisson were made of different size so that a different number of arches 7 were employed, or a different number of arches 4 were employed, the points of intersection would be altered correspondingly. Each of the side walls 1 is connected with the roof 3 by knee braces 11, and each of the end walls 2 is connected to the roof 3 by a similar knee brace 11. Each of the knee braces 11 is constructed in detail as shown in Figs. 4, 5 and 6, and hereinafter fully described.

The working chamber is provided with a pair of transverse bracing trusses, each consisting of an arch 12 having its ends tied together by a transverse chord 13, each chord 13 being beveled to form a cutting edge, and being formed with a metallic reinforcement 14, seen in detail in Figs. 7 and 8, and hereinafter fully described. The side and end walls are beveled at their lower edges for producing a cutting edge and are provided with cutting edge reinforcing means 14, somewhat similar to the chord metallic reinforcements. Each of the arches 12 has its crown formed by a part of the roof 3, and the chord 13 for each arch 12 is connected with the arch centrally of its length by a vertical post 15, which extends from the chord to the soffit of the arch at the crown thereof. The working chamber is also provided with a pair of longitudinally arranged trusses, each extending from one of the end walls to the other end wall and formed integral with the end walls, each truss being spaced from the side wall. Each of the said longitudinal trusses consists of arches 16, 16 arranged end to end and formed integral with each other, and having their ends tied together by a longitudinal chord 17 similar in construction and arrangement to each chord 13. Each of the arches 16 has its crown formed by a part of the roof 3, and is connected at the point of its crown with the chord 17 by a vertical post 18, which extends from the chord 17 to the soffit of the arch. Spaced at each side of the post 18 are posts 19, 19 connecting the chord 17 with the soffit of the respective arch 16, as many posts 19 being used as are desired. The side wall of the working chamber is connected with the roof by knee braces 11, and the end walls are connected by similar knee braces 11.

It is obvious, of course, that the illustration in Figs. 1 to 3 inclusive is on a reduced scale and therefore, I have not shown the detail features of construction therein, but have shown such details on an enlarged scale in Figs. 4 to 11 inclusive.

In Figs. 4 to 6 inclusive, I have illustrated one of the knee braces 11 in detail, and from said figures it will be obvious that each of said knee braces consists of a triangular web 20 to which is bolted angle bars 21, 21. One of the legs of each angle bar is riveted or otherwise suitably secured to the web 20, the other web of the respective angle bar projecting laterally from the web 20 and producing a flat bearing surface. As illustrated, the web 20 is in the form of a right triangle but of course may assume any angle triangle but of course may assume any shape necessary to conform to the angle of the meeting walls, which are to be braced. The legs of the angle bars 21 which form flat surfaces arranged to bear against the walls to be braced are provided with a suitable number of perforations through which are passed bolts 22, 22, each of said bolts having at one end an anchoring washer 23 retained in place by a nut 24. The opposite end of each bolt is provided with a threaded nut 25. In practice, the knee brace 11, as seen in Fig. 4, is placed for instance in the angle formed by the juncture of the roof 3 with one of the side or end walls, and the bolts 22 are embedded in the respective side or end wall and in the roof. After the concrete has set, the nuts 25 are tightened for taking up any slack. The horizontal leg of each brace used in the working chamber is provided with a plurality of slots 26, one for each bolt 22, and in practice each of said slots is filled by a removable plug or filling 27 of any suitable type. When it is desired to fill the working chamber with concrete, the sinking of the caisson having been completed, the nuts 25 are removed and each of the knee braces 11 is moved inwardly, the slots 26 permitting such inward movement, the plugs 27 of course having been removed, and after the respective knee brace has been moved inwardly to a sufficient distance for being free of the inner ends of the horizontal bolts 22, the knee brace is lowered out of engagement with the vertical bolts 22. Thus the knee brace may be used repeatedly. When used in the working chamber the horizontal leg is provided with the slots 26, as the greatest strain coming on the knee brace will be due to the coffer dam filling, and will be downward and therefore a solid metal bearing on the horizontal bolts 22 is desirable. When the knee brace is used in the coffer dam, the greatest strain is horizontal, owing to the inward pressure of the surrounding earth and water on the coffer dam walls, and therefore the leg of the knee brace which is provided with the slots 26 is arranged vertically in the coffer dam so that there will be a solid metal bearing for the nuts of the vertical bolts 22 of the coffer dam knee braces 11.

In Figs. 7 and 8, I have illustrated a form of metallic reinforcement, which is the preferred construction of the reinforcement seen at 14. The said metallic reinforcement consists of a metallic truss having a top chord composed of angles 28, 28, a bottom chord composed of angles 29, 29 and lacing bars or inclined web members 30, 30, connecting the top and bottom chords. A channel iron 31 is riveted to the bottom chord and acts as a cutting edge, and also gives additional tensile strength to the contiguous parts of concrete. Ordinarily the bottom chord, in operation, will be in tension, and the top chord in compression, but when the caisson is being sunk, a considerable upward pressure may be exerted upon the cutting edge while cutting through the earth, and the top chord of the reinforcing truss will then be in tension and the bottom chord in compression. Hence, the desirability of a strong top chord. Attached to the metallic reinforcement in any suitable manner are shown metallic rods 32, 32 and 35, 35 which are used for providing the necessary tensile strength for vertical and inclined posts respectively, connecting the arch chord with the soffit of the arch; and a further means of attaching reinforcement rods, as 34, is illustrated, by the angle irons 33 suitably fastened to the metallic reinforcement. Figs. 7 and 8 indicate the metallic reinforcements of one of the working chamber transverse struts or chords and one of the working chamber longitudinal struts or chords at the point of intersection thereof, the truss which should appear in side elevation in Fig. 7 being shown in dotted lines in order to more clearly disclose the transverse section of the truss seen in side elevation in Fig. 8.

It is, of course, well known to those skilled in the present art, that a caisson is sunk while the working chamber is supplied with air under pressure, and in order to supply air under pressure and to permit the removal of spoil and to permit access of operators, the roof is provided with apertures through which are passed spoil and man shafts and other tubes, signal wires and such other devices as are necessary for the carrying out of the work necessary for excavating beneath the caisson.

In Figs. 1, 2 and 3, I have shown openings in the roof for receiving various shafts, and in Figs. 10 and 11, I have illustrated in detail one of the air shafts. In said Figs. 10 and 11, I have shown the air shaft 36 as extending through the roof 3, and being supported in place by suitable clamps 37, 37, having arms 38, 38 extending into the material of the roof. The shaft 36 is surrounded by a coating 39 of asphalt, tar, pitch or other similar substances, which coating forms a close joint with the tube 36 and prevents leakage of air.

In Fig. 9, I have illustrated an enlarged detail section through a portion of the working chamber wall and roof, and in said figure, I have shown the use of a coating 40 of asphalt, tar, pitch or similar substance for preventing leakage of air. The said coating may be applied in any preferred manner as by the use of a mop, broom or like instrument while the material is in a heated condition. The coatings 39, and 40 are of course applied while in a liquid condition.

In Figs. 12 to 14 inclusive, I have illustrated a slightly modified form of caisson in which 41, 41 indicate suitable side walls, and 42 suitable end walls formed integral with a roof 43 dividing the inclosure produced by said side and end walls into a working chamber below and a coffer dam above. The roof 43 is stiffened and strengthened by continuous knee braces 44 extending about all of the side and end walls and formed integral with the respective side and end walls and with the roof. Within the coffer dam are arranged transverse braces, each consisting of an arch 45 extending from one side wall to the other and formed integral at its ends with said side walls, the said arches being spaced apart and spaced from the end walls. Each of said arches has its ends tied together by the roof 43. Extending longitudinally of the coffer dam are longitudinal arched trusses spaced apart and spaced from the side walls and having their ends formed integral with the end walls, each of said trusses consisting of a number of arches 46. The ends of the arches 46 are tied together by the roof 43. At the point of intersection of the transverse trusses with the longitudinal trusses, the said trusses are formed integral with each other. Above the concrete walls 41 and 42 the coffer dam may be extended by the use of wooden walls 48 if desired, which may be constructed and braced in any preferred manner, and may be secured in place by bolts embedded in the concrete of the walls 41 and 42.

The working chamber is provided with a pair of transverse trusses spaced apart and spaced from the end walls and having their ends formed integral with the side walls, each of said trusses consisting of a transversely arranged arch 49 having its ends tied together by a transverse strut or chord 50. Each chord 50 is of greater thickness than the respective arch 49 and is preferably beveled at its lower edge for forming a cutting edge. The crown of each arch 49 is preferably formed from the roof 43. The working chamber is provided with longitudinal trusses spaced apart and spaced from the side walls, and having their ends formed integral with the end walls, each of said trusses consisting of a number of arches 51 arranged end to end and formed integral with each other, and a longitudinal chord 52 tying all of the ends of the arches 51 together. Each chord 52 is of greater thickness than its respective arch 51, and is preferably beveled at its lower edge for producing a cutting edge, and each arch 51, preferably has its crown formed from the roof 43. The chords 52 are preferably tied together at various points intermediate their length by transverse struts 52', 52', any suitable number of the struts 52' being employed for stiffening the chords 52 and preventing lateral swaying thereof. Each strut 52' is preferably beveled at its lower edge for producing a cutting edge.

In Fig. 15 I have illustrated a structure corresponding exactly to the structure seen in Figs. 12 to 14 inclusive, except that the side walls are shown positioned on an incline so that the working chamber flares downwardly and the coffer dam tapers upwardly. It is obvious, of course, that the end walls may be provided with the same slant so as to produce a caisson of pyramidal form, whereby the base is given an increased area for forming a firm foundation. The same elements are present in the structure seen in Fig. 15 as are seen in Figs. 12 to 14 inclusive, and therefore the same reference numerals have been used and the same description will apply.

In Fig. 16 I have illustrated a further modified form of caisson, which is constructed the same in every detail as the structure seen in Fig. 15, except that instead of having the side and end walls slanting for their full height, the working chamber walls are made vertical while the coffer dam walls are inclined, all the other details being exactly like those described with respect to the structure seen in Figs. 12 to 14 inclusive, and the same reference numerals have therefore been applied and the same description is applicable. The structure seen in Fig. 16 is superior to the structure seen in Fig. 15 for the reason that in sinking the structure seen in Fig. 15 considerable difficulty is experienced in maintaining the caisson in the proper vertical condition, whereas with the structure seen in Fig. 16 the enlarged base is secured while a certain portion of the upright walls are formed vertical so as to guide the caisson in its descent.

In Figs. 17 to 19 inclusive, I have illustrated another modified form of caisson involving the usual side walls 54, 54, and end walls 55, 55 formed integral with a roof 56. The roof divides the inclosure produced by the side and end walls into a coffer dam above and a working chamber below. The coffer dam is provided with transverse trusses spaced apart and spaced from the end walls and formed integral at their ends with the side walls, each of said trusses consisting of arches 57, 57, having their ends tied together by the roof 56, and having their soffits connected with the roof by webs 58, 58, each of which webs extends from one end of its respective arch to the other. The upper edge of each transverse truss at each end thereof is provided with a knee brace 59 which is formed integral with the respective truss, and also formed integral with the side wall. The coffer dam is also provided with longitudinal trusses spaced apart and spaced from the side walls, each of said trusses extending throughout the length of the coffer dam and being formed integral at its ends with the end walls. Each of said longitudinal trusses consists of a number of arches 60, arranged end to end and formed integral, each of said arches having its ends tied together by the roof 56, and having its soffit connected with the roof by a web 61, which extends throughout the length of the arch. Each of the longitudinal trusses, is, of course, formed integral with the transverse trusses at the points of intersection, and at said points the longitudinal and transverse trusses are connected by integral knee braces 62, 62, the ends of the longitudinal trusses being provided with integral knee braces 63, 63 extending from the upper edge of the respective longitudinal truss to the upper edge of the respective end wall and formed integral with the end wall. The working chamber is provided with transverse bracing trusses spaced apart and spaced from the end walls, and each having its ends formed integral with the side walls, each of said trusses being constructed of arches 64, 64, having all of their ends tied together by a transverse strut or chord 65, and each having its soffit connected with the chord by a web 66, which extends throughout the length of the respective arch. It will be observed particularly from Fig. 19 that the middle arch 64 has its crown formed from the roof 56, and the end arches 64 have their crowns formed independently of the roof, the entire truss of course being formed integral with the roof throughout its length. The coffer dam is further provided with longitudinal trusses spaced apart and spaced from the side walls, each of said trusses being formed integral at its ends with the end walls, and integral throughout its length with the roof. Each of said longitudinal trusses consists of a series of arches 67, 67 arranged end to end and having their ends tied together by a longitudinal chord 68, each of the arches 67 having its soffit connected with the chord 68 by a web 69, which extends throughout the length of the respective chord. The crown of each arch 67 is preferably formed from the roof 56. Each of the chords 65 and 68 is preferably beveled at its lower edge for producing a cutting edge.

It is to be observed that the presence of the webs 66 and 69 cause the transverse and longitudinal trusses to be in fact bulk heads, which divide the working chamber into nine compartments, and each corner of each compartment is provided with a trihedral angular filling 71 formed integral with the roof and with the contiguous walls of the compartment and extending from the roof downwardly a sufficient distance for strengthening and bracing the respective walls of the compartment. It will be obvious of course that each of the said compartments may be made of any dimensions desired, and that the size of the caisson may be altered according to the size of the compartments, or the size of the caisson may be enlarged by increasing the number of compartments through an increase in the number of longitudinal and transverse trusses which constitute bulk heads. It is, of course, obvious that the arches and the webs of each of the trusses are formed integral and therefore each truss may be considered merely a bulk head strengthened on each side by a truss having an arched upper chord. Of course, posts similar to posts 18 and 19 may connect chords 65 and 68 with the soffits of the respective arches, if desired.

In Figs. 20 to 23 inclusive, I have illustrated another modified form of caisson in which I employ the usual side walls 71, 71 and end walls 72, 72. A roof 73 is formed integral with the side and end walls, the said side and end walls terminating at the roof and not extending above the same as in the structures hereinafter described. Any suitable wooden coffer dam 74 may be mounted upon the upper edge of the walls 71 and 72. The wooden coffer dam 74 is stiffened by transverse concrete trusses spaced apart and spaced from the ends of the coffer dam, each of which trusses is formed of an arch 75 and a transverse chord 76 tying the ends of the arch together and formed integral with the roof. At each end of the coffer dam is arranged a transverse truss similar to each of the intermediate trusses, and consisting of a transverse arch 77, the ends of said arch being tied by a transverse chord 78 formed integral with the roof. Connecting the end trusses are longitudinal trusses spaced apart and spaced from the side walls of the coffer dam 74, each of said longitudinal trusses being formed integral with the end trusses at its ends and integral with the intermediate trusses at the points of intersection. Each of the longitudinal trusses consists of a series of arches 79 arranged end to end and formed integral with each other, and having all of their ends tied together by a longitudinal chord 80 formed integral with such ends and formed integral with the roof 73. At the point of intersection of each of the longitudinal trusses with the intermediate trusses and at the point of juncture of the ends of each of the longitudinal trusses with the end trusses, the intermediate and end trusses are connected with the longitudinal trusses by knee braces 81, 81. The longitudinal trusses 79 are connected at various points intermediate their length by transverse struts 79', 79', which serve to prevent independent lateral swaying of the longitudinal trusses.

The working chamber below the roof 73 is provided with a transverse centrally disposed truss consisting of an arch 82 having its ends tied together by a transverse strut or chord 83, which is suitably reinforced and tapered for producing a cutting edge. The working chamber is further provided with longitudinal trusses spaced apart and spaced from the side walls and formed integral at their ends with the end walls, and at their upper edges with the roof throughout their length. Each of said trusses consists of arches 84, 84 having their meeting imposts formed integral, and having their ends tied together by a longitudinal chord 85 which is formed with suitable reinforcements and beveled for producing a cutting edge. The inner ends of the arches 84 meet at the point of intersection of the arch 82 and are formed integral therewith. Each of the end walls of the working chamber is paneled out as at 86 producing an arch 87 and a chord 88 tying the ends of the arch 87 together. Each of the side walls is similarly paneled as indicated at 89, but by preference two panels are provided for each side wall, producing two arches with tie chords similar in arrangement to the arches 84 with their chords. The side walls are not shown in elevation as they are concealed by the longitudinal arch in Fig. 21. Each corner produced by the juncture of the roof with the side and end walls as well as each corner produced by the juncture of the roof with the intersecting trusses and with the trusses at the points of juncture with the side or end walls is filled with a trihedral angular filling 90.

It is to be observed that in each of the structures illustrated and described above, except what is disclosed in Figs. 20 to 23 inclusive, the side and end walls are shown as solid and continuous and of substantially the same thickness throughout, but it is of course obvious that paneled walls may be provided and the panels may assume any form desired, various forms of paneling being illustrated in my several co-pending applications for patents, the particular construction of the side and end walls being claimed specifically in my above mentioned copending applications. It is further to be observed that the intrados of the arches seen in Figs. 21 to 23 inclusive, has been formed of a series of chords of arcs of circles. The reason for constructing the intrados of the arch in this manner is that in practice wooden forms are usually employed and much time and labor may be saved by using the lumber in a straight condition instead of bending the same. Of course, if metallic forms are employed the curved intrados will be preferably produced. These remarks are of course applicable to all of the arches disclosed herein.

In Figs. 24 and 25 I have illustrated a further modified construction, a top plan of which would appear the same as Fig. 20 except that the transverse struts 79' are omitted. Paneled side and end walls 91, 91 and 92, 92 respectively are shown provided with an integral roof 93. Mounted upon the upper edge of the walls 91 and 92 is any suitable wooden coffer dam 94 braced by transverse and longitudinal trusses, the transverse trusses being spaced apart and spaced from the end walls of the coffer dam and each being formed of an arch 95, T-shaped in transverse section, and a transverse chord 96 connecting the ends of the arch together. The web 95' of the T of the arch is of course formed integral with the main body portion of the arch and extends throughout the length of the said main body portion, and is preferably provided with knee braces 97, 97 formed integral with said web and with the main portion of the arch and extending throughout the length of the arch. The longitudinal trusses are spaced apart and spaced from the side walls of the coffer dam, as clearly seen in Fig. 25, and each is made up of a series of arches 98 arranged end to end and formed integral with each other, each of said arches being formed T-shaped in transverse section and having the web 98' of the T extending throughout the length of the main body of the respective arch and formed integral therewith, and also connected with said main body by continuous knee braces 99, 99. The arches 98 of each longitudinal truss have their ends tied together by a longitudinal chord 100, and it will be observed that the chords 96 and 100 are all formed integral with the roof. The longitudinal and transverse trusses are, of course, formed integral with each other at the points of intersection. The working chamber produced by the walls 91 and 92 and the roof 93 is provided with a central, transverse truss formed integral at its ends with the side walls and its upper edge with the roof, the said truss consisting of an arch, 101 and a chord 102 arranged transversely of the working chamber and tying the ends of the arch 101 together. As clearly seen in Fig. 24 the arch 101 is T-shaped in transverse section, the web 101' of the T being of course formed integral with the main body portion of the arch and extending throughout the length thereof, the web and main body portion being further connected by knee braces 103, 103 extending throughout the length of the arch. The working chamber is further provided with longitudinal trusses spaced apart and spaced from the side walls, each of said trusses consisting of arches 104, 104 arranged end to end and formed integral, and having their ends tied together by a longitudinal chord 105. Each arch 104 is formed T-shaped in cross section, as indicated in dotted lines in Fig. 25, the web 104' of the T extending throughout the length of the body portion of the arch and being of course formed integral therewith, and being further connected by knee braces 106, 106 extending throughout the length of the arch. At various points intermediate the length of the chords 105, said chords are tied together by transverse struts 106', 106' which are formed integral with the said chords and serve to prevent independent lateral swaying of the chords.

In Figs. 26 to 29 inclusive, I have illustrated another modified form of caisson especially designed for being constructed of large dimensions. The structure seen in Figs. 26 to 29 inclusive involves the usual side walls 107, 107 and end walls 108, 108, provided with the roof 109. A wooden or metallic coffer dam 110 of any preferred type is mounted upon the upper edge of the walls 107 and 108, the walls 107 and 108 extending above the roof 109 only a distance sufficient for accommodating roof beams and chord members. Within the coffer dam are arranged transverse trusses spaced apart and spaced from the ends of the coffer dam. Each of said transverse trusses consists of arches 111, 111 arranged end to end and having their meeting ends formed integral, all of the ends of the arches of each truss being connected by a transverse chord 112, the said chord being formed integral with the roof and with the ends of the arches. The coffer dam is further provided with longitudinal trusses spaced apart and spaced from the sides of the coffer dam, and each formed of a plurality of arches 113, 113 arranged end to end and formed integral, and having their ends tied together by a longitudinal chord 114 formed integral with the roof 109 and also integral with the ends of the arches which are connected together. Each of the arches 113 is strengthened by a central post 115 formed integral with the soffit of the arch at the point of the crown and extending to and formed integral with the respective chord 114. Spaced from the post 115 are similar posts 116, 116 at opposite sides of the post 115, inclined braces 117 being provided for connecting the chord 114 at the lower end of the post 115 with the soffit of the respective arch at the upper ends of the posts 116. Each of the inclined braces 117 is preferably provided at each end with knee braces arranged on opposite sides of the respective brace and formed integral with the contiguous parts. The longitudinal and transverse trusses are of course formed integral at the points of intersection and serve to strengthen and stiffen the roof 109, and to aid in the distribution of stresses thereon. The roof is further strengthened and stiffened by a longitudinal roof beam 118 formed integral with the roof and extending throughout the length thereof. The roof is further provided with a central transverse roof beam 119 extending throughout the width of the roof and formed integral therewith. The roof is further strengthened by a series of transverse roof beams 120, 120, some of which are interrupted by thickened portions 121 at various points of the roof, which thickened portions are provided with openings 122 for accommodating spoil and man shafts.

The working chamber produced by the side walls 107 and end walls 108 and roof 109 is provided with a longitudinal, central truss extending throughout the length of the working chamber and formed integral with the end walls thereof, and also formed integral with the roof throughout the length of the truss. The said truss consists of arches 123 having their ends tied together by a longitudinal chord 124. The chord 124 is connected with each of the arches 123 midway of the length thereof by a vertical post 125 which is formed integral with the chord and with the soffit of the respective arch at the point of its crown. The working chamber is further provided with a transverse truss which is formed integral with the roof and the side walls and is constructed of an arch 126 having its ends connected by a transverse strut or chord 127 which chord is connected with the arch by a vertical post 128 extending from the chord to the soffit of the arch at the point of its crown. It is to be noted that the chord 127 is provided with a cutting edge 129 which lies above the horizontal plane of the cutting edge of the walls 107 and 108, the chord 124 not being provided with a cutting edge and having its lower edge slightly above the horizontal plane of the cutting edge 129. It is, of course, obvious that in all the various types of caissons herein disclosed the chords or struts in the working chamber may be provided with cutting edges or not, as preferred, and in some instances the cutting edges may be arranged above the cutting edge of the vertical walls.

In sinking a caisson it is often found desirable to let the lower edge of the walls of the working chamber into the bed rock for a few inches, but usually the advantage to be gained by letting the lower edge of the chords or struts into the bed rock is not commensurate with the expense necessary, and hence while a cutting edge may be employed such as seen at 129, it is often found desirable to have such cutting edge above the horizontal plane of the vertical walls of the caisson, so as to obviate the necessity of letting the cutting edge of the strut into the bed rock when the edges of the caisson walls are let into the same.

It is to be observed that the crowns of the arches 123 and 126 are formed by the roof 109. The advantage to be gained by this construction lies in the fact that a greater rise for the arches is obtained than would be secured if the crowns of the arches were made independently of the roof, and it is of course understood that within certain limits the greater the rise the stiffer the arch. More head room is also given in the working chamber by the arch having its crown formed by the roof.

In Fig. 27$^a$, I have illustrated a structure embodying exactly the same details as seen in Fig. 27, except that the working chamber longitudinal truss has its arches and tie chord connected by posts 125' spaced from the central post 125 and also connected by inclined web member braces 125'', each of the inclined web members being preferably provided at each end with knee braces. As every other detail of the structure is the same as that described with respect to Fig. 27, the same reference numerals have been applied and the same description is applicable. It is obvious, of course, that any number of the inclined web members may be provided for the transverse trusses of the working chamber, if desired.

In Figs. 30 to 33 inclusive, I have illustrated a further modified form of caisson in which are employed the usual side walls 130, 130, end walls 131, 131 and roof 132, the side walls and roof being formed integral, and the roof serving to divide the inclosure produced by the walls into a working chamber below and a coffer dam above, the walls of the coffer dam being illustrated as paneled and the working chamber walls being shown solid. It is, of course, obvious that the working chamber walls may be paneled if desired, and if preferred the coffer dam walls may be solid. The coffer dam is provided with transverse inclined web member trusses 133, 133 and with a longitudinal inclined web member truss 134, the truss 134 being formed integral with the trusses 133 at the points of intersection. The lower chord of each of the trusses 133 and 134 is formed independently of and integral with the roof 132, and the said trusses are formed at their ends integral with the respective walls of the coffer dam. The roof 132 in addition to the longitudinal and transverse trusses is further strengthened by transverse roof beams 135, 135, which are preferably crowned, or in other words formed with an arched upper edge as indicated in Figs. 32 and 33.

The working chamber is provided with a series of transverse trusses, each consisting of an arch 136 having its ends tied together by a transverse strut or chord 137. The crown of each of the arches 136 is shown as formed independently of and integral with the roof 132, but may be otherwise constructed if preferred, and the chords 137 which are shown with flat lower edges are suitably reinforced and may be provided with cutting edges if desired. Between the intrados of each arch 136 and the under side of the roof 132 are placed fillings 136' for strengthening purposes, which are formed integral with the arch, the roof, and the walls 130, and each of which extends approximately to the middle of the respective truss. The fillings 136' give the vertical faces of the transverse trusses a curved effect, as seen in dotted lines in Fig. 30, or in other words the vertical faces of the trusses are convex, but it is obvious that the fillings 136' may be provided with flat outer faces which would produce the effect of a flare at each end of the trusses. It is, of course, obvious that any of the other trusses may be provided with similar fillings as found desirable.

In Figs. 34 to 39 inclusive, I have illustrated another modified form of caisson which involves an inclosing wall having sides 138, 138 formed integral with a roof 139, the cross sectional contour of the caisson being illustrated as hexagonal, but, of course, the caisson may be constructed polysided with a greater or less number of sides without deviating from the spirit and scope of the invention or materially affecting the results attained. The walls 138 are shown solid, although they may be trussed or paneled if desired. The coffer dam is divided into two compartments by a transverse bulkhead 140 having enlarged top and bottom chords, the bottom chord being formed separately from and integral with the roof 139. The bulk head connects two of the diametrically opposite corners of the walls 138 and is intersected by trusses 141, 141 arranged parallel, and each connecting two of the corners of the walls 138. The trusses 141 and bulk head 140 are formed integral at the points of intersection, and the ends of the said trusses and bulk head are formed integral with the wall. Each of the trusses 141 consists of an upper and a lower chord tied together at points intermediate their length by vertical posts, the lower chord being formed independently of and integral with the roof 138.

The working chamber is provided with trusses connecting each set of diametrically opposite corners, each of said trusses consisting of an arch 142 having its ends tied together by a chord 143. All of the arches 142, though not necessarily, have their crowns at the same point, which is at the center of the roof 138, the crowns of all of said arches being formed by the roof. The chords 143 are of course formed integral at the points of intersection, and each is shown as provided with a suitable metallic reinforcement and beveled for forming a cutting edge, though the cutting edge may be omitted if desired, or it may be raised above the horizontal plane of the wall cutting edge. This form of caisson is especially adapted for use for foundations of the pivot piers of swinging bridges, for light houses and the like, and of course, as above intimated may be made for any cross sectional contour preferred. When formed with corners as illustrated, I preferably provide a metallic shield 144 for each of the corners, which shield is curved to conform with the curvature of the corners and embedded in the material of the wall, the shield being retained in place by suitable anchoring pins or bolts having heads countersunk in the shield and their body portions extending into the concrete of the wall. A fragment of one of the shields is shown in detail in Figs. 35 and 36.

In Figs. 40 to 44 inclusive, I have illustrated a further modified form of caisson which is provided with the usual side walls 145, 145, end walls 146, 146 and roof 147, the roof dividing the inclosure produced by the walls into a working chamber below and a coffer dam above. The inclosing walls are illustrated as trussed or paneled and may be, as far as the present invention is concerned, constructed in any preferred manner, the trusses of the side walls being seen in Fig. 42 as being of the ordinary inclined web member type, and the trusses of the end walls as indicated in Fig. 44 being of the same type. The coffer dam is provided with a central, longitudinal truss having its ends formed integral with the end walls and being constructed of a series of arches 148 having their ends tied together by a series of inverted arches 149. The arches 148 and 149 are each illustrated as semi-circular, but of course, the span and rise of each arch may be altered as desired according to the results to be attained. The arches 148 have their crowns connected with the crowns of the arches 149 by vertical posts 150, each of said posts being formed integral with the soffits of its respective arches. The coffer dam is further provided with transverse trusses spaced apart and spaced from the end walls and formed integral at their ends with the side walls and with the longitudinal truss at the points of intersection, each of said transverse trusses consisting of a pair of arches, 151, having their ends tied together by inverted arches 152. Each arch 151 has its crown connected with the crown of its respective inverted arch 152 by a vertical post 153. Each of the transverse trusses and the longitudinal truss has its lower edge formed integral with the roof 147, and knee braces 154, 154, are formed integral with the roof and the said trusses at each side thereof. In addition to the longitudinal and transverse trusses, the roof 147 is further strengthened by transverse roof beams 155, 155, and longitudinal roof beams 156, 156. Each of the longitudinal and transverse roof beams is provided at each side with an integral knee brace 157 formed integral with the roof. The longitudinal beams 156 are interrupted at various points intermediate their length by thickened portions 158, each provided with an aperture 159 for the reception of a man or spoil shaft. At the point of the thickened portions 158, suitable knee braces 160 are formed integral with said thickened portions and with the contiguous transverse beam 155 or the lower chord of the transverse truss. Each of the transverse roof beams 155 at the point of intersection with the lower chord of the longitudinal truss is formed integral with said lower chord, and is further connected therewith by an integral knee brace 161, each transverse roof beam 155 being provided at each end with a knee brace 162 formed integral with the respective beam and with the respective side wall. Each of the longitudinal beams 156 at the point of intersection with each of the roof beams 155 and with each of the lower chords of the transverse trusses is provided with integral knee braces 163. Each of the longitudinal beams 156 is provided at each end with a similar knee brace 164 formed integral with the respective end wall. The roof 147 is connected with the side and end walls by a continuous knee brace 165.

The working chamber is provided with a central, longitudinal truss having its ends formed integral with the end walls, and its upper edge formed integral with the roof, said truss consisting of a series of arches 166 formed integral with each other and having their ends tied together by similarly constructed inverted arches 167. The arches 166 and 167 are illustrated as having the span and rise necessary for each to produce a semi-circle so that the two arches together produce a circle. It is of course obvious that the span or rise or both may be altered at will. The crowns of the arches 166 are indicated as formed by the roof 147. The working chamber is further provided with transverse trusses spaced apart and spaced from the end walls and having their ends formed integral with the side walls, and their upper edges formed integral with the roof. Each of said transverse trusses consists of a series of arches 168 constructed and arranged similarly to the arches 166, (except that the crowns are not formed by the roof) and having their ends tied together by a series of inverted arches 169, similar in construction and arrangement to the arches 167. Suitable knee braces 170, 170 connect the working chamber walls and roof, and similar knee braces 171 connect the roof with the longitudinal and transverse trusses.

In Figs. 45 to 48 inclusive, I have illustrated a further modified form of caisson involving the usual side walls 172, 172, end walls 173, 173 and roof 174 formed integral therewith, and dividing the inclosure produced by the side and end walls into a coffer dam above and a working chamber below. The walls 172 and 173 are illustrated as provided with arched panels or arched trusses, but it is of course obvious that any preferred construction of walls may be utilized as far as the present invention is concerned. The walls are strengthened by vertical posts 175 arranged at intervals, and extending from the upper edge of the coffer dam wall to the lower edge of the working chamber wall, being interrupted intermediate their length by the roof 174 and formed integral therewith. The lower edge of each of the posts 175 is beveled off to the cutting edge of the respective wall. The coffer dam is provided with a series of transverse bulk heads, 176, and the working chamber is provided with a series of transverse arches 177, one arch 177 being arranged immediately beneath each of the bulk heads 176. Each arch 177 preferably has its crown formed by the roof 174, and the ends of each arch are retained against spreading apart or approaching each other by a structure hereinafter fully described, having substantially the function of a tie chord, but having the advantage of leaving the working chamber space entirely free. The said substitute for a tie chord consists in a vertically disposed metallic truss 178 embedded in each of the side walls at each end of each arch 177, each truss 178 being connected at their upper ends by a transverse truss embedded in the respective bulk head 176. Each of the said transverse trusses consists of an upper chord 179 preferably made up of an openwork truss, and a lower chord 180 preferably similarly constructed, the chords 179 and 180 being connected by inclined web members 181. It is to be observed that when the external pressure acting inwardly on the side walls of the working chamber exceeds the internal pressure, the chord 180 will be in compression while the chord 179 will be in tension, and when the internal pressure acting outwardly from within the working chamber exceeds the external pressure, the chord 180 will be in tension and the chord 179 will be in compression. Therefore, it is obvious that each of the vertical trusses 178 with its transverse connecting truss serves as a chord for the respective arch, and effectually prevents any movement of the ends of the arch independently of each other. As illustrated, each truss 178 is preferably formed of an open-work of inclined web members connecting two parallel chords, but it is obvious of course that the said trusses 178, as well as the transverse trusses connecting the same, may be constructed in any desired form. I preferably embed within the intrados of each arch 177 an arched shaped truss 182 made up of parallel chords connected by an open-work of inclined web members.

It is of course obvious that the trusses 178 are simply posts which are connected intermediate their length and at or near their upper ends by the members, and the said posts may be constructed in any form desired, and the tie members may be of any preferred type, without either being limited to the truss formation shown and described, although such formation produces a simple, cheap and efficient structure in combination with the concrete masonry employed. It is further obvious that while I have illustrated this type of arch tying means only in connection with a transverse arch, the same may be applied to any form of arch, the dimensions of the parts being varied as found necessary and desirable.

In Figs. 49 to 52 inclusive, I have illustrated a further embodiment of the present invention employing the usual side walls 183, 183 formed integral with a roof 184, the said side walls being made continuous of curved end walls 185, 185. As illustrated, the end walls 185 are substantially semi-circular, but of course the arcs struck by the end walls may have any radii desired. It is thus seen that the usual working chamber and coffer dam are produced, and, as clearly indicated in dotted lines in Fig. 49, the end and side walls are preferably paneled or formed with integral wall trusses, but it is obvious, as far as the present invention is concerned, that the walls may be otherwise constructed. The coffer dam is provided with a longitudinal, central truss extending throughout the length of the coffer dam and formed integral at its ends with the end walls and having its lower edge formed integral with the roof, the said truss consisting of a series of arches 186 having their ends tied together by the roof 184. The coffer dam is further provided with a series of transverse trusses spaced apart and spaced from the end walls, each consisting of a transverse arch 187 having its ends tied together by the roof 184. The arches 187 intersect the arches 186 at the points of the meeting ends thereof, and all of said arches are formed integral at the points of intersection. It is of course obvious that any number of arches 187 may be provided, and if a greater or less number is provided than illustrated and the arches are evenly distributed throughout the length of the caisson, assuming the same number of arches to be employed in the longitudinal truss, the arches 187 would intersect the arches 186 at points different from those indicated in the drawing.

At various points about the coffer dam walls the knee braces 188, 188 are formed integral with the walls proper and with the wall truss. The longitudinal and transverse trusses divide the roof into squares, some of which are provided with openings 189 for the reception of man and spoil shafts, one of the knee braces 188 being provided opposite each of the shaft openings 189. Knee braces 190 are formed integral with the roof and side walls of the coffer dam and extend from the upper edge of the coffer dam walls to the roof, one knee brace 190 being provided for each square of the roof not formed with a shaft opening 189, though more knee braces 190 may be used if desired. The end portions of the coffer dam are strengthened by knee braces 191, 191 which are similar in construction to the knee braces 190 except that the knee braces 191 are preferably much larger. Immediately beneath the knee braces 191, within the working chamber, are provided similar knee braces 192, 192, the said knee braces 191 and 192 serving to materially stiffen and strengthen the roof and aid in the distribution of strains from the roof to the end walls. Beneath each of the knee braces 188 and 190 within the working chamber are arranged knee braces 193, which are formed integral with and connect the wall proper with the wall trusses. By preference, continuous knee braces 194 connect the chords of the wall trusses with the wall proper, the said continuous knee braces being formed integral with the connected parts and extending throughout the length of the side and end walls, except where interrupted by posts or web members of the respective wall trusses.

A knee brace 195 is formed integral with each of the end walls and with the under edge of the upper chord of the respective end wall truss, each knee brace 195 extending continuously throughout the length of the respective end wall, except where interrupted by posts or web members of the end wall trusses.

In the working chamber is arranged a longitudinal central truss having its ends formed integral with the end walls and its upper edge formed integral with the roof, said truss consisting of a series of arches 196, 196 having their ends tied together by a longitudinal chord 197, said chord being preferably provided with a suitable reinforcement and beveled for producing a cutting edge.

The working chamber is further provided with transverse trusses formed integral at their ends with the side walls and at their upper edges with the roof, each of the said transverse trusses consisting of an arch 198 having its ends tied together by a transversely arranged chord 199, each chord 199 being preferably reinforced and beveled downwardly for producing a cutting edge. The longitudinal and transverse trusses are of course formed integral at the points of intersection.

The structure seen in top plan view in Fig. 34, as above intimated, is susceptible of being varied in contour, and in Figs. 53 to 55 inclusive, I have illustrated a modified form of caisson which incorporates the features of construction involved in the structure disclosed in Fig. 34 with the vertical wall shown circular in transverse section. In said Figs. 53 to 55 inclusive, I have illustrated an inclosing cylindrical wall 200 which is provided with a roof 201 dividing the said inclosing wall into a coffer dam above and a working chamber below. As illustrated, the inclosing wall 200 is paneled or provided with integral wall trusses. The wall truss for the coffer dam consists of a continuous series of arches 202 having their ends tied together by a continuous chord 203. The working chamber wall truss may be similarly constructed, but as illustrated, the chamber wall truss consists simply of an upper chord 204 and a lower chord 205, the chords 204 and 205 being continuous and being connected at various points by vertical posts. Some of the vertical posts of the working chamber wall truss, as indicated at 205, are in alinement with some of the posts produced by the meeting ends of the arches 202. The working chamber is provided with three trusses, each having its ends formed integral with the vertical walls and its upper edge formed integral with the roof, and each consisting of an arch 206 extending diametrically across the caisson from side to side, and having a chord 207 tying its ends together. All of the said chamber trusses intersect at the center of the working chamber, and are of course formed integral at the points of intersection, the crown of all of the intersecting arches being connected by a vertical post 208 with all of the chords 207 at their point of intersection. The soffit of each of the arches is further connected with the respective chord of the arch by vertical posts 209 spaced from the post 208. Each of the chords 207 is preferably reinforced and beveled downwardly for producing a cutting edge. It is to be observed that the chords 207 occupy a considerable space in the working chamber and therefore the form of chords or arch tying means disclosed in Figs. 45 to 48 inclusive, might advantageously be used in the structure illustrated in Figs. 53 to 55 inclusive. Suitable knee braces 210 are preferably provided between each of the posts 205 and the roof.

The coffer dam is provided with a truss 211, lying immediately above one of the trusses of the working chamber and connecting diametrically opposite points of the vertical wall 200. The truss 211 is intersected by similar trusses 212 which are arranged parallel and spaced apart. Each of the trusses 211 and 212 consists of an upper and lower chord connected by inclined web members and vertical posts. By preference one of the vertical posts of the truss 211, as indicated at 213, is in vertical alinement with the post 208, and the central vertical posts, indicated at 214, 214 of the trusses 212, which are the intermediate vertical posts of the truss 211, are arranged in vertical alinement with the vertical posts 209, 209 of the arch 206 immediately beneath the truss 211. The roof of the coffer dam is strengthened by roof beams 215, 215, each interrupted by a thickened portion 216 of the roof which is provided with a shaft opening 217. At one side of each of the roof beams 215 is provided a thickened portion of the roof 218 formed with a shaft opening 219, and a roof beam 220 extends from each of the roof beams 215 to the opposite thickened portion 218. Each of the roof beams 215 and 220 is, of course, formed integral with the roof, and each of the roof beams 215 is braced by knee braces 221, 221 which are formed integral with the vertical wall and with the respective roof beams, and which are skewed so as to have their vertical faces parallel with the vertical faces of the respective roof beam. In addition to the roof beam 215, at diametrically opposite points there are provided relatively short roof beams 215' which extend from the inclosing wall to the respective thickened portion 216, and each of which is provided with a knee brace 221'.

In Figs. 56 to 67 inclusive, I have illustrated the detail features of a caisson designed especially for the same purposes as the structures seen in Figs. 34 to 39 inclusive and in Figs. 53 to 55 inclusive, the specific details differing slightly from both of said structures. The usual inclosing wall 225, which is formed polysided, as clearly seen in Fig. 56 is provided. A roof 226 is formed integral with the wall 225 and divides the inclosure into a working chamber below and a coffer dam above. As clearly indicated in detail in Fig. 58, and as seen in dotted lines in Fig. 56, the wall 225 is preferably formed with a series of curved or arched recesses 227, although of course it is obvious that any form of panel may be provided for the wall, the curved or arched construction being preferred.

Within the working chamber are arranged arches 228, 228 connecting diametrically opposite corners of the wall 225, each of said arches being formed integral with the wall and with the roof 226, each arch having its ends connected by a chord 229. Each chord 229 is preferably connected with its respective arch 228 by posts 230, 230, each post extending from its respective chord 229 to and being formed integral with the soffit of the corresponding arch. It is, of course, obvious that each arch with its chord and connecting posts forms a bracing truss. The arches 228 of course intersect at the point of their crowns which point is at the center of the inclosure. The chords 229 of necessity intersect at a point immediately beneath the point of intersection of the arches and the crowns of all of the arches are connected with all of the chords by a central vertical post 231. The lower edge of the wall 225 is, of course, formed into a cutting edge and is provided with a cutting edge metallic reinforcement 232, the said metallic reinforcement preferably consisting, as seen in Figs. 66 and 67, of a vertical truss 233 fixed to a horizontal truss 234. The trusses 233 and 234 may be of any detail structure desired, but each preferably consists of angle iron chords connected by a lacing of inclined web members. The lower chord of the truss 233 is fixed to a channel iron 235, which channel iron constitutes the exposed lower edge of the inclosing wall 225. As seen in Fig. 59, each of the chords 229 is beveled at its lower edge for producing a cutting edge, and is provided with a metallic reinforcement 236 which consists, as indicated in Figs. 63 to 65 inclusive, of a vertical truss 237 secured to an upper horizontal truss 238. The truss 238 is preferably made up of parallel angle bars connected by a lacing of inclined web members, which web members are connected intermediate their length to the upper chord of the truss 237. The truss 237 preferably consists of upper and lower chord members (each formed of a pair of angle irons) and a lacing of inclined web members. It is, of course, obvious that the metallic reinforcement 232, at the several points of the corners of the wall 225, is formed with the angle corresponding with the angle of the wall, and the parts of the truss are secured by any suitable stays and gussets desired. In Figs. 63 and 65, I have indicated one of the corners which is also the point of juncture of the reinforcement of one of the chords 229. The two reinforcements are suitably secured together by riveted connecting plates or stays 239. At the point of intersection of the chords 229, the metallic reinforcements for the several chords of course intersect as indicated in Figs. 61 and 62. The upper face of the several metallic reinforcements, at the point of juncture, is preferably covered by a suitable connecting plate 240, which is riveted or otherwise suitably secured to all of the intersecting trusses 238. The lower chords of the intersecting trusses 237 are also preferably secured together by a suitable plate 241, which is riveted to all of said lower chords.

In the coffer dam are arranged trusses connecting diametrically opposite corners of the wall 225, one of said trusses being arranged immediately above each of the arches 228, and each of said trusses consisting of an upper chord member 242, a lower chord member 243, intermediate vertical posts 244, a central vertical post 245, and inclined web members 246, 246, the posts 244 and 245 and the web members 246 being formed integral with the upper and lower chords. The central post 245 is, of course, central with respect to all of the coffer dam trusses, and is in vertical alinement with the post 231. The roof 226 is formed in the coffer dam with roof beams 247, 247, which are formed integral with the roof and connect those diametrically opposite corners of the wall 225 which are not connected by the trusses. Some of the roof beams 247 are interrupted intermediate their length by shaft openings 248, 248, the roof being thickened about each shaft opening as indicated at 249.

Suitable cross roof beams 250, 250 intersect each of the roof beams 247 and extend to the chords 243 of the contiguous trusses.

In the working chamber are arranged knee braces 251, 251 which are formed integral with the roof and with the posts existing between the recesses 227. Immediately above each of the knee braces 251, in the coffer dam, is arranged a knee brace 252, each knee brace 252 being formed integral with the corresponding post and integral with one of the roof beams 247.

It is obvious from the foregoing that the present invention contemplates the production of a caisson having a maximum capacity for the resistance of strains, constructed of a minimum amount of material and at a minimum expenditure of time and labor.

It is thought to be unnecessary to discuss at length the many advantages attained by the structures disclosed herein, as such advantages will be obvious to any one skilled in the art and will become more obvious with the computation of stresses and their distribution, and it will be further obvious that the specific detail features of novelty in the several modifications are susceptible of use in a single structure, the several modifications having been shown as modifications for the purpose of making each particular feature of construction more readily understood.

While the present invention relates particularly to the forms of bracing within the caisson and coffer dam, and does not especially refer to the construction of the upright walls of the caisson, a type of such construction being covered more particularly by my copending application filed of even date herewith, I wish it distinctly understood that this line of division shall not be construed to unnecessarily restrict the meaning of the appended claims, but I wish said claims to be interpreted as broadly as their terms permit in the light of the prior art.

I have employed the term "concrete" throughout the specifications and claims, and desire the same to be construed as meaning any of the cement compounds as well as any form of masonry; and while I have illustrated several forms of metallic reinforcement, which will be of practical value, I wish it understood that as much or as little of this reinforcement may be used as is found desirable, and also that any other form or forms of reinforcement and as much of same may be used as desired.

What I claim is,—

1. In a concrete caisson, the combination with an inclosing wall forming a working chamber, of an arched brace connecting the opposite sides of the wall and extending across the working chamber.

2. In a concrete caisson, the combination with an inclosing wall, of a truss extending across the inclosure produced by said wall, and having its ends formed integral with the wall, one of the members of the truss being arched.

3. In a concrete caisson, the combination with an inclosing wall, of a truss extending across the inclosure produced by said wall and having its ends formed integral with the wall, said truss comprising an arch, and means retaining the ends of said arch against movement toward or away from each other.

4. In a concrete caisson, the combination with an inclosing wall, of a truss extending across the inclosure produced by said wall and having its ends formed integral with the wall, the said truss comprising an arch, and means connecting the ends of the arch together.

5. In a concrete caisson, the combination with an inclosing wall, of a truss extending across the inclosure produced by said wall, said truss comprising a concrete arch, and means for preventing separation of the ends thereof.

6. In a concrete caisson, the combination with an inclosing wall, of a truss extending across the inclosure produced by said wall, the said truss comprising a concrete arch, and means for preventing the ends of the arch from approaching each other.

7. In a concrete caisson, the combination with an inclosing wall, of a truss extending across the inclosure produced by said wall, said truss comprising an arch, a chord connecting the ends thereof together and means connecting said chord with the soffit of the arch.

8. In a concrete caisson, the combination with an inclosing wall, of a truss extending across the inclosure produced by said wall, said truss comprising an arch, a chord connecting the ends thereof, and means connecting the chord to the soffit of the arch at the point of the crown.

9. In a concrete caisson, the combination with an inclosing wall, of a truss extending across the inclosure produced by said wall, said truss comprising an arch, a chord connecting the ends thereof together and a post formed integral with the chord and also formed integral with the soffit of the arch.

10. In a concrete caisson, the combination with an inclosing wall, of a truss extending across the inclosure produced by said wall, said truss comprising an arch, a chord connecting the ends thereof, a central post connecting the chord with the soffit of the arch at the point of the crown, and posts arranged at the sides of the central post and spaced therefrom.

11. In a concrete caisson, the combination with an inclosing wall, and a roof, of a truss extending across the inclosure produced by said wall and having its ends formed integral with the wall and one of its edges formed integral with the roof, one of the members of said truss being arched.

12. In a concrete caisson, the combination with an inclosing wall and a roof, of an arched brace extending across the inclosure produced by said wall and formed integral with the wall and the roof.

13. In a concrete caisson, the combination with an inclosing wall, of a truss extending across the space inclosed by said wall, comprising an arch and a chord connecting the ends of the arch, the lower portion of the chord being formed into a cutting edge.

14. In a concrete caisson, the combination with an inclosing wall, of a plurality of trusses extending across the space inclosed by said wall, and each having its ends formed integral with the wall, each of said trusses having one of its members arched.

15. In a caisson, the combination with an inclosing wall, of intersecting trusses extending across the space inclosed by said wall, each of said trusses having one of its members arched.

16. In a cassion, the combination with an inclosing wall, of trusses extending across the space inclosed by said wall, some of said trusses intersecting other of said trusses, and each of said trusses having one of its members arched.

17. In a caisson, the combination with an inclosing wall, of a truss extending across the space inclosed by said wall, and a second truss intersecting the first truss, one of said trusses having one of its members arched.

18. In a caisson, the combination with an inclosing wall and a roof, of intersecting trusses arranged above said roof, and intersecting trusses arranged beneath said roof, some of said intersecting trusses being provided with arched members.

19. In a caisson, the combination with an inclosing wall and a roof, of an arched brace arranged above said roof and an arched brace arranged beneath said roof, each of said braces being spaced from the inclosing wall except at its ends.

20. In a caisson, the combination with an inclosing wall and a roof, of an arched brace extending across the inclosure and arranged above the roof and formed integral therewith, and an arched brace extending across the inclosure and arranged beneath the roof and formed integral therewith.

21. In a caisson, the combination with an inclosing wall, of an arched brace extending across the inclosure and having its ends formed integral with the wall, and a knee brace at each end of said arched brace formed integral with the brace and with the wall.

22. In a caisson, the combination with an inclosing wall, of intersecting braces extending across the inclosure, and a knee brace formed integral with both of said braces and disposed at the point of intersection, one of said braces being arched.

23. In a caisson, the combination with an inclosing wall, of an arched brace extending across the inclosure, a second brace intersecting the first brace, knee braces formed integral with the opposite sides of one of said intersecting braces and formed integral with the other of said intersecting braces.

24. In a caisson, the combination with an inclosing wall, of intersecting braces arranged within the inclosure, knee braces formed integral with the upper edge of one of said braces and also formed integral with the opposite sides of the other of said braces at the point of intersection.

25. In a concrete caisson, the combination with an inclosing wall, of a knee brace disposed for stiffening and strengthening said wall, and means embedded in the wall for temporarily retaining said knee brace in place.

26. In a concrete caisson, the combination with an inclosing wall, an element arranged at an angle to said wall, a removable knee brace, and means embedded in said wall and said element for detachably connecting the knee brace to the wall and to said element.

27. In a concrete caisson, the combination with an inclosing wall and a roof formed integral therewith, of a knee brace disposed in the angle produced by the juncture of the wall with the roof, and bolts embedded in the material of the wall and roof and detachably engaging said knee brace.

28. In a caisson, the combination with the elements to be braced, of a knee brace having one of its legs slotted, and the other of its legs apertured, bolts engaging the elements to be braced and extending through the slotted and apertured portions of the knee brace, and nuts engaging the bolts for retaining the knee brace in position.

29. The combination with the elements to be braced, of a knee brace having an aperture formed in one of its legs and a slot formed in the other, a bolt engaging one of the elements to be braced and extending through the aperture, a bolt engaging the other of said elements to be braced and extending through said slot, a filling for said slot and nuts engaging said bolts for detachably retaining the knee brace in place.

30. In a concrete caisson, the combination with an inclosing wall having a cutting edge, of a metallic reinforcement for said cutting edge comprising a truss and a channel iron fixed to the lower chord of the truss.

31. In a concrete caisson, the combination with an inclosing wall having a cutting edge, of a metallic truss reinforcing said cutting edge, tie rods connected with said truss and extending upwardly into the inclosing wall, and a channel iron fixed to the lower edge of the truss.

32. In a concrete caisson, the combination with an inclosing wall and a brace arranged therein having a cutting edge, of a reinforcement for said cutting edge comprising upper and lower chord members and connecting members for said chord members, and tie rods connected with the connecting members of the truss and embedded in the material above the truss.

33. In a concrete caisson, the combination with an inclosing wall having a cutting edge, of a trussed reinforcement for said cutting edge, a cross bar fixed to the reinforcement transversely thereof, and tie rods extending from said cross bar into the material above said reinforcement.

34. In a concrete caisson, the combination with the elements to be braced, of a detachable knee brace disposed for bracing said elements and having legs arranged in angular relation to each other, bolts embedded in the concrete of said elements to be braced, and detachably engaging the legs of said knee brace, and connecting means for the free ends of said legs for bracing the same.

35. In a caisson, the combination with an inclosing wall, of a pair of trussed arches extending across the inclosure, and means connecting one of the longitudinal members of one truss with one of the longitudinal members of the other truss for interbracing the trusses against independent lateral movement.

36. In a caisson, the combination with an inclosing wall, of trussed arches arranged within the inclosure, a brace intersecting said trusses, and means connecting one of the longitudinal members of one truss with one of the longitudinal members of the other truss.

37. In a caisson, the combination with an inclosing wall, or arched brace therefor, said arched brace being formed T-shaped in transverse section.

38. A concrete caisson, comprising upright walls disposed vertically for a portion of their height and inclined for the remaining portion thereof, and a roof connected integrally therewith.

39. In a caisson, the combination with an inclosing wall, of an arched brace therefor formed T-shaped in transverse section, and knee braces connecting the main body of the T with the web thereof.

40. In a caisson, the combination with an inclosing wall, of an arched brace therefor formed T-shaped in transverse section, and a continuous knee brace arranged on each side of the arched brace and connecting the main body of the T with the web thereof and extending throughout the length of the arched brace.

41. In a caisson, the combination with inclosing walls and a brace therefor extending across the inclosure, comprising a series of arches arranged end to end and formed integral.

42. In a caisson, the combination with an inclosing wall, and a roof, dividing the inclosure into a coffer dam above and a working chamber below, of braces arranged in the coffer dam and working chamber, each of said braces comprising a series of arches arranged end to end and formed integral.

43. In a caisson, the combination with an inclosing wall and roof dividing the inclosure into a working chamber and a coffer dam, of trusses formed integral with the walls at their ends and with the roof throughout their length, the intermediate portions of the trusses being spaced from the walls, each of said trusses comprising arches formed integral, and means connecting the ends of the arches together.

44. In a caisson, the combination with inclosing walls and a roof producing a working chamber, of a truss formed integral at its ends with the wall and spaced therefrom intermediate its length, said truss comprising a series of arches arranged end to end and formed integral, and means connecting the ends of said arches.

45. In a caisson, the combination with an inclosing wall, of a pair of trusses extending across the inclosure, and means connecting the chord of one of the trusses with the chord of the other truss for preventing independent lateral movement of the truss.

46. In a caisson, the combination with an inclosing wall, of trusses arranged within the inclosure, a brace intersecting said trusses, and means connecting the chord of one of the trusses with the chord of the other truss.

47. In a caisson, the combination with an inclosing wall, of a pair of trusses arranged therein, each comprising an arch and a chord connecting the ends of the arch, and means connecting said chords together for preventing independent lateral movement thereof.

48. In a caisson, the combination with an inclosing wall, of trusses arranged therein, each comprising an arch and a chord connecting the ends thereof, and a strut connecting the chords together.

49. In a caisson, the combination with an inclosing wall, of trusses arranged therein, and each comprising a plurality of arches arranged end to end and formed integral, a chord connecting the ends of the arches together, and struts connecting said chords at points intermediate the length of the arches.

50. In a caisson, the combination with an inclosing wall, of trusses each comprising a plurality of arches arranged end to end and a chord connecting the ends of the arches together, and a strut for the chord of each arch connecting the same with the corresponding chord of the other truss.

51. In a caisson, the combination with an inclosing wall, of trusses arranged therein, braces intersecting said trusses and connecting the same, and struts connecting the chord of one of the trusses with the chord of the other truss.

52. In a caisson, the combination with an inclosing wall, of trusses arranged therein and each comprising a series of arches, a chord connecting the ends thereof, braces intersecting said trusses at the points of the meeting ends of the arches and connecting the trusses, and struts connecting the chords at points intermediate the length of the arches.

53. A caisson comprising inclined upright walls and a roof formed integral therewith, and means for guiding the caisson during descent.

54. A caisson, comprising upright walls disposed vertically from the lower edge for a portion of their height and inclined above the vertical portion, and a roof connected with said walls.

55. A caisson, comprising an inclosing, vertical, upright wall, a roofing formed integral therewith, and an inclined upright inclosing wall above said wall.

56. In a caisson, the combination with an inclosing wall and a roof producing a working chamber, of intersecting trusses arranged therein, one of the members of one of the trusses being arched, and a trihedral angular filling arranged in each corner produced by the juncture of the roof with the intersecting trusses.

57. In a caisson, the combination with an inclosing wall and a roof, of intersecting braces having their ends connected with the wall, trihedral angular fillings in the corners produced by the juncture of the roof with the intersecting braces and the juncture of the roof and wall with the ends of the braces.

58. In a caisson, the combination with an inclosing wall and a roof, of a brace having its ends connected with the wall, and a trihedral angular filling arranged in one of the corners produced by the juncture of the ends of the brace with the roof and wall.

59. In a caisson, the combination with an inclosing wall and a roof, of a brace arranged within the inclosure, a second brace arranged within the inclosure and intersecting the first brace, both of said braces being connected with the roof, and a trihedral angular filling for one of the corners produced by the juncture of the roof with the braces at the point of intersection.

60. In a caisson, the combination with inclosing walls and a roof producing a working chamber, a brace arranged within said working chamber and connected with the roof, and a trihedral angular filling for one of the corners produced by the juncture of the brace with the wall and roof.

61. In a caisson, the combination with inclosing concrete walls, of intersecting trusses concrete braces formed integral at their ends with said walls and integral with each other at the intersection.

62. In a caisson, the combination with an inclosing wall, of a truss arranged within the inclosure and comprising an arch, a chord connecting the ends thereof, posts connecting the chord with the soffit of the arch and inclined braces also connecting the chord with the soffit of the arch.

63. In a caisson, the combination with a working chamber, of trusses arranged above the same, and struts connecting the upper chords of said trusses and formed integral therewith.

64. In a caisson, the combination with an inclosing wall and a roof, of trusses arranged above the roof, and a strut connecting the upper chords of said trusses and formed integral therewith.

65. In a caisson, the combination with inclosing walls and a roof, of trusses arranged beneath said roof, and a strut connecting the lower chords of said trusses.

66. In a caisson, the combination with an inclosing wall and a roof formed integral therewith, of an arch formed integral with the roof, and wall, and a roof beam also formed integral with the roof and wall, and arranged above the roof in the vertical planes of the arch, the said roof beam having its upper edge curved.

67. In a caisson, the combination with an inclosing wall and a roof formed integral therewith, of an arch arranged beneath the roof and formed integral therewith, and a roof beam arranged above the roof and formed integral therewith.

68. In a caisson, the combination with inclosing walls and a roof, of an arch at one side of the roof, and connected therewith for strengthening the same, and a roof beam on the other side of said roof and connected therewith for strengthening the same.

69. In a caisson, the combination with an inclosing wall, of a plurality of arches arranged for bracing the said wall, some of said arches intersecting at a given point.

70. In a caisson, the combination with an inclosing wall, of arches connecting opposite points of said wall, the several arches forming substantially equal angles with the surface of said wall.

71. In a caisson, the combination with an inclosing wall, of arches connecting opposite points of said wall, said arches intersecting within the caisson.

72. In a caisson, the combination with an inclosing wall, of arches arranged therein and each connecting opposite points of the wall, the crowns of some of said arches intersecting the crowns of other of said arches.

73. In a caisson, the combination with an inclosing wall, of arches connecting opposite points of said wall and chords connecting the ends of said arches, some of said chords intersecting within the caisson.

74. In a caisson, the combination with a polysided inclosing wall, of arches connecting opposite portions of said wall, the several arches forming substantially equal angles with the surface of said wall.

75. A caisson, comprising a polysided inclosing wall and arches connecting portions of said wall, some of said connecting members arranged to resist the transverse strains upon the others.

76. A caisson, comprising a polysided inclosing wall, trusses connecting portions of said wall, one of the members of each of said trusses being arched and arranged to resist transverse strains upon the corresponding member of an adjacent truss.

77. A caisson, comprising a polysided inclosing wall and roof dividing the inclosure into a working chamber below and a coffer dam above, bracing means in the coffer dam for the inclosing wall braces in the working chamber connecting portions of said wall and means for preventing such braces from displacement in any direction.

78. In a caisson, the combination with an inclosing wall of a plurality of arches connecting various portions of the wall, each disposed in a substantially vertical plane, the axis of some of said arches being at an angle to the axis of others, and chords for such arches, some of such chords intersecting.

79. In a caisson, an inclosing wall, a brace located therein and connecting one portion of said wall with another portion thereof, and means for resisting transverse strains exerted on said brace intermediate of the ends thereof said means being cast with the braces, forming with each a substantially integral structural member.

80. In a caisson, an inclosing wall, a brace located therein and connecting one portion of said wall with another portion thereof, and means for resisting transverse and twisting strains exerted on said brace intermediate of the ends thereof said means being cast with the braces, forming with each a substantially integral structural member.

81. In a caisson, the combination with an inclosing wall and a roof dividing the same into a working chamber below and a coffer dam above, roof beams formed integral with the roof and knee braces formed integral with the roof beams and with the inclosing wall, each of said knee braces being skewed.

82. In a caisson, the combination with an inclosing wall, of an arched brace therefor, formed T-shaped in transverse section.

83. In a caisson, the combination with an inclosing wall, of an arched brace connected therewith, and a projecting rib formed integral with the soffit of the arch.

84. In a caisson, the combination with an inclosing wall producing a working chamber, of a truss connecting the opposite sides thereof and extending across the inclosure, said truss comprising an arch, a tie connecting the ends thereof, vertical posts connecting said tie with the arch intermediate the length of the arch, and an inclined web member connecting the tie with the arch.

85. In a caisson, the combination with an inclosing wall producing a working chamber, of a truss extending across the inclosure and comprising an arch, a tie connecting the ends thereof, vertical posts connecting said tie with said arch, inclined web members connecting the tie with the arch, and knee braces at each end of each inclined web member.

86. In a caisson, the combination with an inclosing wall, of a brace connecting the opposite sides thereof and formed with concaved upright faces.

87. In a caisson, the combination with an inclosing wall, of a truss connecting the opposite sides thereof, and comprising an arch, and fillings for the corners produced by the juncture of the arch with the side walls, said fillings having their outer faces curved for giving a curved effect to the upright faces of the arch.

88. In a caisson, the combination with an upright inclosing wall, and a roof therefor, of a truss connecting the opposite sides of the wall and formed integral with the wall and roof, and fillings formed integral with the wall and roof, and extending from the wall approximately to the middle of the truss.

89. In a caisson, the combination with an inclosing wall, of an arch connecting the opposite sides thereof, and fillings for the corners produced by the juncture of the arch with the wall, each filling extending from the soffit of the arch to the upper edge thereof and from the inclosing wall approximately to the middle of the arch.

90. In a caisson, the combination of a polysided inclosing wall, a roof dividing the same into a working chamber below and a coffer dam above, intersecting trusses arranged in the working chamber and connecting opposite points of the wall the several trusses forming substantially equal angles with said wall, and intersecting trusses arranged in the coffer dam and connecting opposite points of the wall, one of the coffer dam trusses being disposed immediately above each of the working chamber trusses.

91. In a caisson, the combination with an inclosing wall and a roof dividing the same into a working chamber below and a coffer dam above, of trusses arranged in the working chamber and extending across the inclosure in position for intersecting within the working chamber, and trusses arranged in the coffer dam and extending across the inclosure in position for intersecting at substantially equal angles therein.

92. In a caisson, the combination with an inclosing wall and a roof dividing the same into a working chamber and a coffer dam, of trusses extending across the coffer dam inclosure and connecting opposite points of the wall, the trusses being disposed to intersect within the coffer dam.

93. In a caisson, the combination with a polysided inclosing wall, formed at its lower edge with a cutting edge, of a metallic reinforcement for said cutting edge, comprising a vertical truss and a horizontal truss connected therewith, both of said trusses being formed with angles to correspond with the corners of the wall.

94. In a caisson, the combination with an inclosing wall, of a metallic reinforcement embedded therein, a brace connecting opposite points of said wall, a metallic reinforcement embedded in said brace, and means connecting the ends of the last mentioned metallic reinforcement with the first mentioned reinforcement.

95. In a caisson, the combination with a polysided inclosing wall having a cutting edge, of a metallic reinforcement embedded in said cutting edge and formed with angles corresponding to the corners of the wall, a chord connecting two corners of the wall, a metallic reinforcement embedded in said chord, and means connecting the second mentioned reinforcement with the angles of the first mentioned reinforcement.

96. In a caisson, the combination with a polysided inclosing wall having a cutting edge, of a horizontal truss embedded therein, a vertical truss fixed to said horizontal truss, the said trusses being formed with angles corresponding to the corners of the wall, a chord connecting two corners of the wall, a vertical truss embedded in said chord, a horizontal truss fixed to said last mentioned vertical truss, and stays connecting the ends of the trusses of the chord with the trusses of the cutting edge.

97. In a caisson, the combination with an inclosing wall, of chords having a common point of intersection arranged to brace the wall, a horizontal metallic truss embedded in each of said chords, means connecting the horizontal trusses at the point of intersection, a vertical truss depending from each of the horizontal trusses, and means connecting the vertical trusses at the point of intersection.

98. In a caisson, the combination with an inclosing wall, of chords arranged to strengthen the same, some of said chords intersecting others, a metallic reinforcement for each of said intersecting chords, a plate at the point of intersection, and means connecting said plate to all of said metallic reinforcements.

99. In a caisson, the combination with an inclosing wall, of chords arranged to strengthen the same, some of said chords intersecting others, a horizontal truss embedded in each of the intersecting chords and a plate arranged at the point of intersection and secured to all of the intersecting trusses.

100. In a caisson, the combination with an inclosing wall, of chords arranged to strengthen the same, some of said chords intersecting others, a vertical truss embedded in each of the intersecting chords, and a plate at the point of intersection secured to all of said intersecting vertical trusses.

101. In a caisson, the combination with an inclosing wall, of chords arranged to strengthen the same, some of said chords intersecting others, a horizontal truss embedded in each of said intersecting chords, a vertical truss embedded in each of the intersecting chords and each connected with the corresponding horizontal truss, a plate connected to all of the intersecting horizontal trusses at the point of intersection, and a plate connected to all of the intersecting vertical trusses at the point of intersection.

In testimony whereof I affix my signature in presence of two witnesses.

OLIVER CROMWELL EDWARDS, Jr.

Witnesses:
EVERETT C. BROWN,
HENRY COLVIN.